United States Patent
Huang et al.

(10) Patent No.: US 11,184,918 B1
(45) Date of Patent: Nov. 23, 2021

(54) METHOD AND APPARATUS FOR TRANSPORT BLOCK GENERATION WITH UL SPATIAL MULTIPLEXING IN A WIRELESS COMMUNICATION SYSTEM

(71) Applicant: ASUSTek Computer Inc., Taipei (TW)

(72) Inventors: Yi-Hsuan Huang, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/314,103

(22) Filed: May 7, 2021

Related U.S. Application Data

(60) Provisional application No. 63/022,739, filed on May 11, 2020.

(51) Int. Cl.
| | |
|---|---|
| *H04W 72/14* | (2009.01) |
| *H04W 28/02* | (2009.01) |
| *H04W 80/02* | (2009.01) |
| *H04W 72/04* | (2009.01) |
| *H04W 72/12* | (2009.01) |

(52) U.S. Cl.
CPC ....... *H04W 72/14* (2013.01); *H04W 28/0278* (2013.01); *H04W 72/0446* (2013.01); *H04W 72/1257* (2013.01); *H04W 72/1289* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 9,287,942 B2* | 3/2016 | Kang | H04B 7/0404 |
| 2017/0318606 A1* | 11/2017 | Lee | H04W 74/004 |

FOREIGN PATENT DOCUMENTS

| | | |
|---|---|---|
| WO | 2017052182 A1 | 3/2017 |
| WO | 2020116753 A1 | 6/2020 |
| WO | 2020166852 A1 | 8/2020 |

OTHER PUBLICATIONS

ASUSTeK, "PDU generation for UL spatial multiplexing", 3GPP TSG-RAN WG2 Meeting #110 electronic, R2-2005551, Agenda Item: 4.5, Document for: Discussion and Decision, Jun. 1-12, 2020.
"Way forward on PUSCH demodulation requirements for 30% throughput test point", 3GPP TSG-RAN WG4 Meeting #94-e-bis, R4-2005551, Agenda item: 6.18 [NR_perf_enh-Perf], Document for: Approval, Apr. 20-30, 2020.

* cited by examiner

*Primary Examiner* — Hong S Cho
(74) *Attorney, Agent, or Firm* — Cooper Legal Group, LLC

(57) ABSTRACT

A method and apparatus are disclosed. In an example from the perspective of a User Equipment (UE) configured with uplink (UL) spatial multiplexing and UL skipping, the UE receives, from a base station, two UL grants for a Transmission Time Interval (TTI). The UE generates two Medium Access Control (MAC) Protocol Data Units (PDUs) for the TTI, wherein a first MAC PDU of the two MAC PDUs is able to accommodate all available data of the UE. The UE transmits the two MAC PDUs to the base station.

20 Claims, 9 Drawing Sheets

METHOD AND APPARATUS FOR TRANSPORT BLOCK GENERATION WITH UL SPATIAL MULTIPLEXING IN A WIRELESS COMMUNICATION SYSTEM

CROSS-REFERENCE TO RELATED APPLICATIONS

The present Application claims the benefit of U.S. Provisional Patent Application Ser. No. 63/022,739 filed on May 11, 2020, the entire disclosure of which is incorporated herein in its entirety by reference.

FIELD

This disclosure generally relates to wireless communication networks, and more particularly, to a method and apparatus for transport block generation with uplink (UL) spatial multiplexing in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE) configured with uplink (UL) spatial multiplexing and UL skipping, the UE receives, from a base station, two UL grants for a Transmission Time Interval (TTI). The UE generates two Medium Access Control (MAC) Protocol Data Units (PDUs) for the TTI, wherein a first MAC PDU of the two MAC PDUs is able to accommodate all available data of the UE. The UE transmits the two MAC PDUs to the base station.

In an example from the perspective of a UE configured with UL spatial multiplexing and UL skipping, the UE receives, from a base station, two UL grants for a TTI. The UE generates two MAC PDUs for the TTI. A first MAC PDU of the two MAC PDUs merely comprises a first MAC Control Element (CE), for a first padding Buffer Status Report (BSR) or for a first periodic BSR, with zero MAC Service Data Units (SDUs). A second MAC PDU of the two MAC PDUs comprises at least one of available data of the UE or a MAC SDU. The UE transmits the two MAC PDUs to the base station.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.321 V15.8.0, "E-UTRA, MAC protocol specification"; 3GPP TS 36.331 V15.8.0, "E-UTRA, RRC protocol specification"; 3GPP TS 36.211 V15.8.1, "E-UTRA, Physical channels and modulations"; 3GPP TS 36.213 V15.8.0, "E-UTRA, Physical layer procedure"; 3GPP TS 36.212 V15.8.0, "E-UTRA, Multiplexing and channel coding". The standards and documents listed above are hereby expressly incorporated by reference in their entirety.

Figure 1:
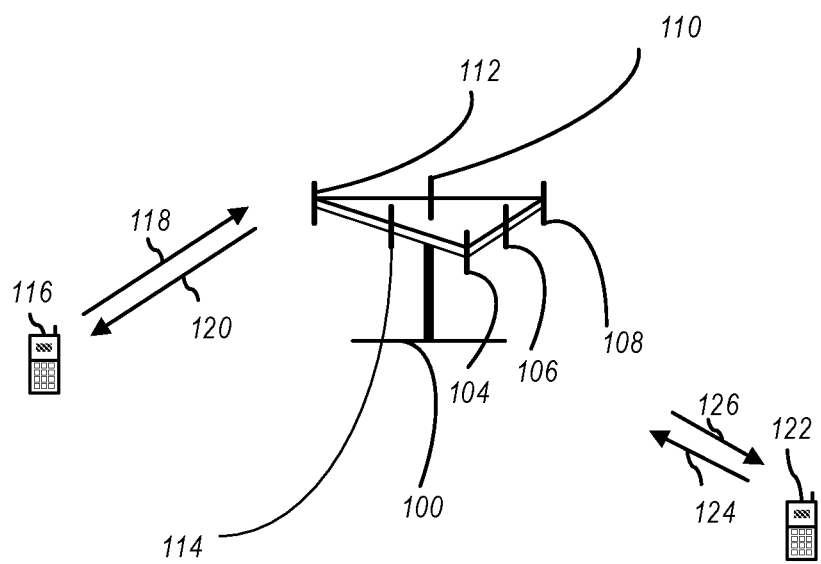
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
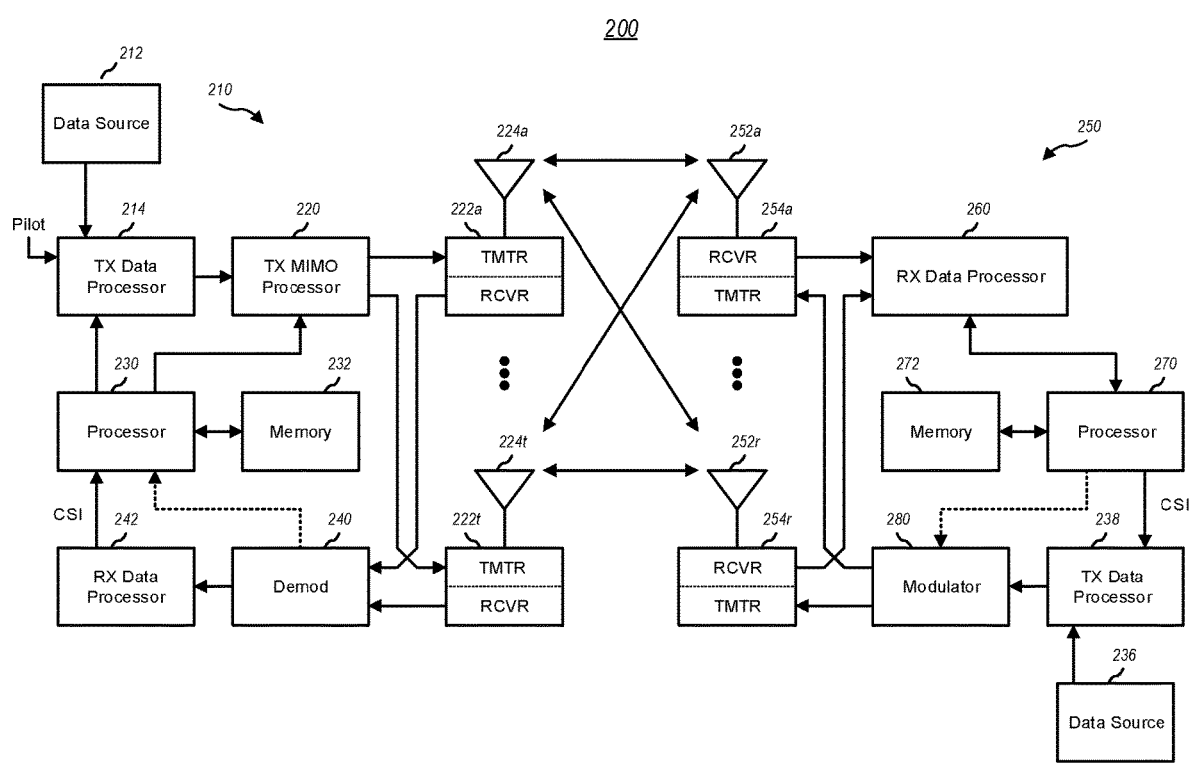
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
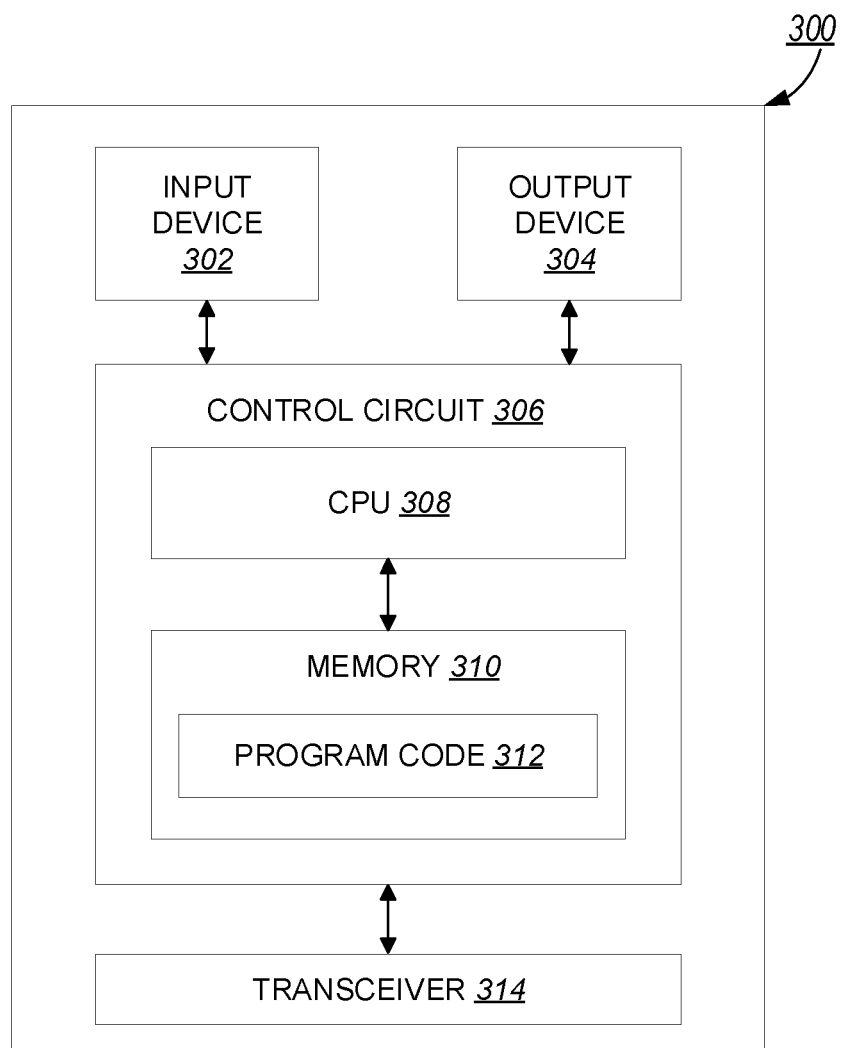
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
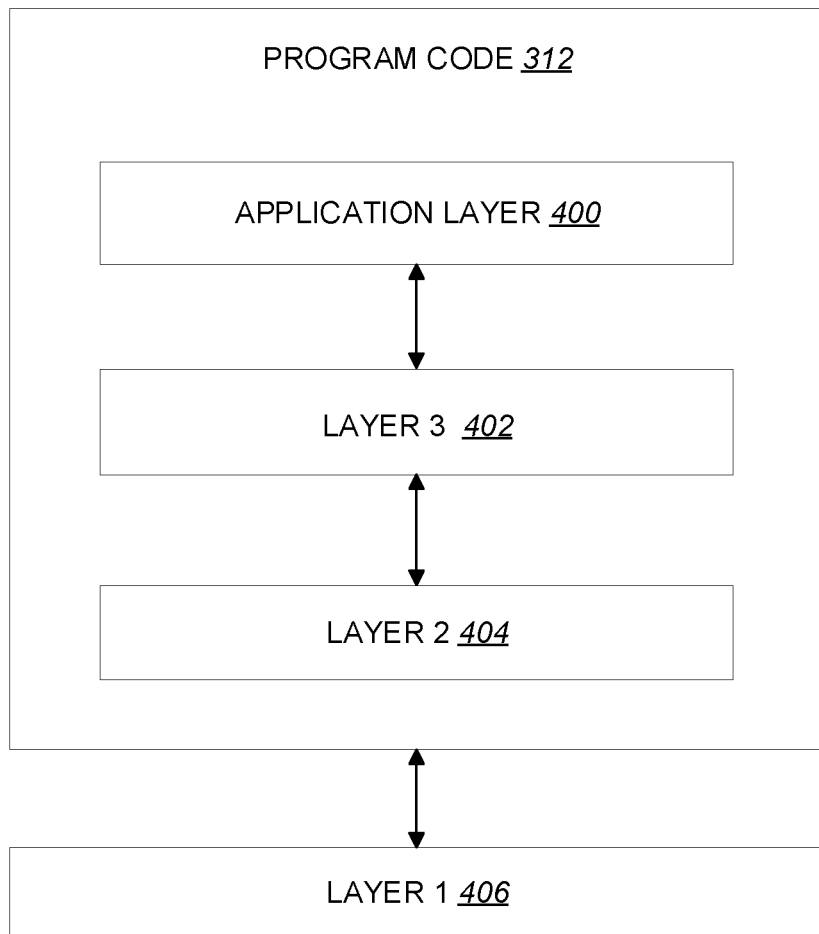
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In LTE, a Medium Access Control (MAC) in a UE receives an uplink (UL) grant at each TTI, and/or a Hybrid Automatic Repeat Request (HARQ) entity of the UE identifies a HARQ process for each UL grant. For each HARQ process (after identifying HARQ processes for UL grants, for example), the UE obtains a Medium Access Control (MAC) Protocol Data Unit (PDU) for transmission from a Multiplexing and assembly entity of the UE. When an UL grant is available for a TTI, the UE may skip the UL grant (and/or may not generate a MAC PDU), such as called uplink skipping, under some conditions, e.g., if there is no uplink data (e.g., MAC Service Data Unit (SDU)) and/or if the MAC PDU merely comprises a MAC CE (e.g., a MAC CE, for padding BSR or periodic BSR, with zero MAC SDUs). Details of UL transmission procedure are provided in 3GPP TS 36.321 V15.8.0. Portions of 3GPP TS 36.321 V15.8.0 are quoted below:

5.4 UL-SCH Data Transfer
5.4.1 UL Grant Reception
In order to transmit on the UL-SCH the MAC entity must have a valid uplink grant (except for non-adaptive HARQ retransmissions) which it may receive dynamically on the PDCCH or in a Random Access Response or which may be configured semi-persistently or preallocated by RRC. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, a UL Semi-Persistent Scheduling V-RNTI, a AUL C-RNTI, or a Temporary C-RNTI, the MAC entity shall for each TTI and for each Serving Cell belonging to a TAG that has a running timeAlignmentTimer and for each grant received for this TTI and for each SPS configuration that is indicated by the PDCCH addressed to UL Semi-Persistent Scheduling V-RNTI:

if an uplink grant for this TTI and this Serving Cell has been received on the PDCCH for the MAC entity's C-RNTI or Temporary C-RNTI; or
    if an uplink grant for this TTI has been received in a Random Access Response:
    < . . . >
    deliver the uplink grant and the associated HARQ information to the HARQ entity for this TTI.
    < . . . >

5.4.2 HARQ Operation
5.4.2.1 HARQ Entity
There is one HARQ entity at the MAC entity for each Serving Cell with configured uplink,
< . . . >
When the physical layer is configured for uplink spatial multiplexing, as specified in TS 36.213 [2], there are two HARQ processes associated with a given TTI. Otherwise there is one HARQ process associated with a given TTI.
At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).
< . . . >
For each TTI, the HARQ entity shall:
    identify the HARQ process(es) associated with this TTI, and for each identified HARQ process:
    if an uplink grant has been indicated for this process and this TTI:
        < . . . >
        obtain the MAC PDU to transmit from the "Multiplexing and assembly" entity, if any;
        if a MAC PDU to transmit has been obtained:
            deliver the MAC PDU and the uplink grant and the HARQ information to the identified HARQ process;
            instruct the identified HARQ process to trigger a new transmission.
        else:
            flush the HARQ buffer of the identified HARQ process.

5.4.2.2 HARQ Process
Each HARQ process is associated with a HARQ buffer.
< . . . >
If the HARQ entity requests a new transmission, the HARQ process shall:
< . . . >
    store the MAC PDU in the associated HARQ buffer;
    store the uplink grant received from the HARQ entity;
    generate a transmission as described below.
< . . . >
To generate a transmission, the HARQ process shall:
    if the MAC PDU was obtained from the Msg3 buffer; or
    if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or
    < . . . >- instruct the physical layer to generate a transmission according to the stored uplink grant with the redundancy version corresponding to the CURRENT_IRV value;
    < . . . >

5.4.3 Multiplexing and Assembly
5.4.3.1 Logical Channel Prioritization
The Logical Channel Prioritization procedure is applied when a new transmission is performed.
< . . . > The MAC entity shall perform the following Logical Channel Prioritization procedure when a new transmission is performed on an UL grant with a certain TTI length:
    The MAC entity shall allocate resources to the logical channels that are allowed to transmit using the TTI length of the grant, in the following steps:
        Step 1: All the allowed logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
        Step 2: the MAC entity shall decrement Bj by the total size of MAC SDUs served to logical channel j in Step 1;
    NOTE 1: The value of Bj can be negative.
        Step 3: if any resources remain, all the allowed logical channels are served in a strict decreasing priority order (regardless of the value of Bj) until either the data for that logical channel or the UL grant is exhausted, whichever comes first. Logical channels configured with equal priority should be served equally.
    The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);

< . . . >

If the MAC PDU includes only the MAC CE for padding BSR or periodic BSR with zero MAC SDUs and there is no aperiodic CSI requested for this TTI, as specified in TS 36.213 [2], the MAC entity shall not generate a MAC PDU for the HARQ entity in the following cases:

in case the MAC entity is configured with skip UplinkTx-Dynamic and the grant indicated to the HARQ entity was addressed to a C-RNTI; or in case the MAC entity is configured with skipUplinkTxSPS and the grant indicated to the HARQ entity is a configured uplink grant activated by the MAC entity's Semi-Persistent Scheduling C-RNTI or by the MAC entity's UL Semi-Persistent Scheduling V-RNTI; or in case the grant indicated to the HARQ entity is a configured uplink grant activated by the MAC entity's AUL C-RNTI.

For the Logical Channel Prioritization procedure, the MAC entity shall take into account the following relative priority in decreasing order:

MAC control element for C-RNTI or data from UL-CCCH;
MAC control element for DPR;
MAC control element for SPS confirmation;
MAC control element for AUL confirmation;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from any Logical Channel, except data from UL-CCCH;
MAC control element for Recommended bit rate query;
MAC control element for BSR included for padding;
MAC control element for Sidelink BSR included for padding.

NOTE 2: When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

5.4.3.2 Multiplexing of MAC Control Elements and MAC SDUs

The MAC entity shall multiplex MAC control elements and MAC SDUs in a MAC PDU according to clauses 5.4.3.1 and 6.1.2.

Configurations of uplink skipping may be provided by Radio Resource Control (RRC), such as specified in 3GPP TS 36.331 V15.8.0. Portions of 3GPP TS 36.331 V15.8.0 are quoted below:

MAC-MainConfig

The IE MAC-MainConfig is used to specify the MAC main configuration for signalling and data radio bearers. All MAC main configuration parameters can be configured independently per Cell Group (i.e. MCG or SCG), unless explicitly specified otherwise.

| MAC-MainConfig information element |
| --- |
| -- ASN1START |
| MAC-MainConfig ::=           SEQUENCE { |
|   <...> |
|   [[ skipUplinkTx-r14           CHOICE { |
|     release                      NULL, |
|     setup                        SEQUENCE { |
|       skipUplinkTxSPS-r14          ENUMERATED {true} |
|   OPTIONAL,   -- Need OR |
|       skipUplinkTxDynamic-r14      ENUMERATED {true} |
|   OPTIONAL -- Need OR |
|     } |
|   }                             OPTIONAL,   -- Need ON |
|   <...> |
| } |
| <...> |

| skipUplinkTxDynamic |
| --- |
| If configured, the UE skips UL transmissions for an uplink grant other than a configured uplink grant if no data is available for transmission in the UE buffer as described in TS 36.321 [6]. |
| skipUplinkTxSPS |
| If configured, the UE skips UL transmissions for a configured uplink grant if no data is available for transmission in the UE buffer as described in TS 36.321 [6]. E-UTRAN always configures skipUplinkTxSPS when there is at least one SPS configuration with semiPersistSchedIntervalUL shorter than sf10 or when at least one SPS-ConfigUL-STTI is configured for the cell group. |

UL spatial multiplexing is introduced to boost UL data rate. Multiple layers with different data may be transmitted on a same time/frequency resource (e.g., one or more resource elements and/or one or more resource blocks), e.g., by mapping the multiple layers to multiple antenna elements or multiple antenna ports. In some examples, with UL spatial multiplexing, there may be up to four layers and/or up to two transport blocks (codewords) supported for UL transmission in a Transmission Time Interval (TTI), e.g., a subframe. A UE may be able to utilize UL spatial multiplexing when a (UL, for example) transmission mode, e.g., transmission mode 2 (e.g., UL transmission mode 2), is configured. Physical Downlink Control Channel (PDCCH) and/or Downlink Control Information (DCI) may be used to enable or disable spatial multiplexing. For example, DCI format associated with single antenna port (e.g., DCI format 0) may be used to disable spatial multiplexing. When a UE receives a DCI format associated with single antenna port, the UE may perform a corresponding Physical Uplink Shared Channel (PUSCH) transmission without spatial multiplexing (with a single antenna port, for example). PUSCH transmission without spatial multiplexing comprises a single transport block (and/or a single codeword). DCI format associated with spatial multiplexing (e.g., DCI format 4) may be used to enable spatial multiplexing. When a UE receives a DCI format associated with spatial multiplexing, the UE may perform corresponding PUSCH transmission with spatial multiplexing (with multiple antenna ports, for example). PUSCH transmission with spatial multiplexing may comprise a single transport block (e.g., a single codeword) or two transport blocks (e.g., two codewords). Information carried on a DCI format associated with spatial multiplexing may be used to disable a transport block of the corresponding PUSCH transmission. Information carried on a DCI format associated with spatial multiplexing may be used to inform the UE that the corresponding PUSCH transmission comprises a single transport block (e.g., one transport block enabled and one transport block disabled) or two transport blocks (e.g., both transport blocks enabled). For example, resource block assignment field and modulation coding scheme field associated with a transport block in a DCI format associated with spatial multiplexing may be used to inform the UE whether the transport block is enabled or disabled (e.g., a transport bock is disabled if either the combination of $I_{MCSs}=0$ and $N_{PRB}>1$ or the combination of $I_{MCS}=28$ and $N_{PRB}=1$ is signaled). Details related to spatial multiplexing are provided in 3GPP TS 36.211 V15.8.1, 3GPP TS 36.213 V15.8.0, and 3GPP TS 36.212 V15.8.0.

Figure 5:
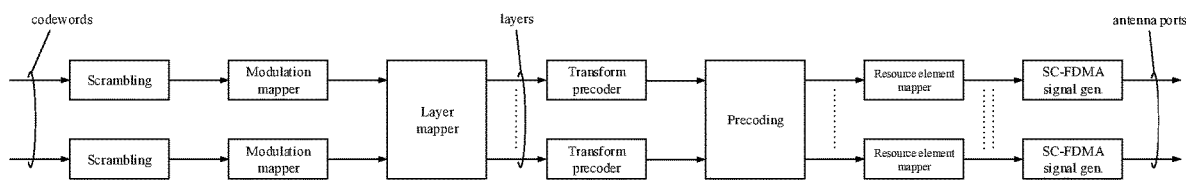
FIG. 5 is a diagram illustrating an exemplary scenario associated with uplink physical channel processing according to one exemplary embodiment.

Notably, FIGS. 5.3-1 of Section 5.3 of 3GPP TS 36.211 V15.8.1, entitled "Overview of uplink physical channel processing", is reproduced herein as FIG. 5. Portions of 3GPP TS 36.211 V15.8.1 are quoted below:

5.3 Physical Uplink Shared Channel

The baseband signal representing the physical uplink shared channel is defined in terms of the following steps:
  scrambling
  modulation of scrambled bits to generate complex-valued symbols
  mapping of the complex-valued modulation symbols onto one or several transmission layers
  transform precoding to generate complex-valued symbols
  precoding of the complex-valued symbols
  mapping of precoded complex-valued symbols to resource elements
  generation of complex-valued time-domain SC-FDMA signal for each antenna port FIGS. 5.3-1: Overview of Uplink Physical Channel Processing

< . . . >

5.3.2A.2 Layer Mapping for Spatial Multiplexing

For spatial multiplexing, the layer mapping shall be done according to Table 5.3.2A.2-1. The number of layers υ is less than or equal to the number of antenna ports P used for transmission of the physical uplink shared channel.

The case of a single codeword mapped to multiple layers is only applicable when the number of antenna ports used for PUSCH is four, except for slot-PUSCH and subslot-PUSCH transmission where a single codeword is used irrespective of the number of layers.

TABLE 5.3.2A.2-1

Codeword-to-layer mapping for spatial multiplexing

| Number of layers | Number of codewords | Codeword-to-layer mapping $i = 0, i, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |

TABLE 5.3.2A.2-1-continued

Codeword-to-layer mapping for spatial multiplexing

| Number of layers | Number of codewords | Codeword-to-layer mapping $i = 0, i, \ldots, M_{symb}^{layer} - 1$ | |
|---|---|---|---|
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |
| 4[1] | 1[1] | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = M_{symb}^{(0)}/4$ |

NOTE 1:
Only used for slot-PUSCH and subslot-PUSCH

< . . . >

5.3.3A.2 Precoding for Spatial Multiplexing

Precoding for spatial multiplexing is only used in combination with layer mapping for spatial multiplexing as described in clause 5.3.2A.2. Spatial multiplexing supports P=2 or P=4 antenna ports where the set of antenna ports used for spatial multiplexing is p∈{20,21} and p∈{40,41,42,43}, respectively.

Precoding for spatial multiplexing is defined by $$\begin{bmatrix} z^{(0)}(i) \\ \vdots \\ z^{(P-1)}(i) \end{bmatrix} = W \begin{bmatrix} y^{(0)}(i) \\ \vdots \\ y^{(v-1)}(i) \end{bmatrix}$$

where $i=0, 1, \ldots, M_{symb}^{ap}-1$, $M_{symb}^{ap}=M_{symb}^{layer}$.

The precoding matrix w of size p×v is given by one of the entries in Table 5.3.3A.2-1 for P=2 and by Tables 5.3.3A.2-2 through 5.3.3A.2-5 for P=4 where the entries in each row are ordered from left to right in increasing order of codebook indices.

TABLE 5.3.3A.2-1

Codebook for transmission on antenna ports {20,21}

| | Number of layers | |
|---|---|---|
| Codebook index | υ = 1 | υ = 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | |
| 2 | $\frac{1}{\sqrt{2}}\begin{bmatrix} 1 \\ j \end{bmatrix}$ | |
| 3 | $\frac{1}{\sqrt{2}}\begin{bmatrix} 1 \\ -j \end{bmatrix}$ | |
| 4 | $\frac{1}{\sqrt{2}}\begin{bmatrix} 1 \\ 0 \end{bmatrix}$ | |
| 5 | $\frac{1}{\sqrt{2}}\begin{bmatrix} 0 \\ 1 \end{bmatrix}$ | |

TABLE 5.3.3A.2-2

Codebook for transmission on antenna ports {40,41,42,43} with v = 1

| Codebook index | Number of layers v = 1 |
|---|---|
| 0–7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8–15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16–23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

TABLE 5.3.3A.2-3

Codebook for transmission on antenna ports {40,41,42,43} with v = 2

| Codebook index | Number of layers v = 2 |
|---|---|
| 0–3 | $\frac{1}{2}\begin{bmatrix}1&0\\1&0\\0&1\\0&-j\end{bmatrix}$ $\frac{1}{2}\begin{bmatrix}1&0\\1&0\\0&1\\0&j\end{bmatrix}$ $\frac{1}{2}\begin{bmatrix}1&0\\-j&0\\0&1\\0&1\end{bmatrix}$ $\frac{1}{2}\begin{bmatrix}1&0\\-j&0\\0&1\\0&-1\end{bmatrix}$ |
| 4–7 | $\frac{1}{2}\begin{bmatrix}1&0\\-1&0\\0&1\\0&-j\end{bmatrix}$ $\frac{1}{2}\begin{bmatrix}1&0\\-1&0\\0&1\\0&j\end{bmatrix}$ $\frac{1}{2}\begin{bmatrix}1&0\\j&0\\0&1\\0&1\end{bmatrix}$ $\frac{1}{2}\begin{bmatrix}1&0\\j&0\\0&1\\0&-1\end{bmatrix}$ |
| 8–11 | $\frac{1}{2}\begin{bmatrix}1&0\\0&1\\1&0\\0&1\end{bmatrix}$ $\frac{1}{2}\begin{bmatrix}1&0\\0&1\\1&0\\0&-1\end{bmatrix}$ $\frac{1}{2}\begin{bmatrix}1&0\\0&1\\-1&0\\0&1\end{bmatrix}$ $\frac{1}{2}\begin{bmatrix}1&0\\0&1\\-1&0\\0&-1\end{bmatrix}$ |
| 12–15 | $\frac{1}{2}\begin{bmatrix}1&0\\0&1\\0&1\\1&0\end{bmatrix}$ $\frac{1}{2}\begin{bmatrix}1&0\\0&1\\0&-1\\1&0\end{bmatrix}$ $\frac{1}{2}\begin{bmatrix}1&0\\0&1\\0&1\\-1&0\end{bmatrix}$ $\frac{1}{2}\begin{bmatrix}1&0\\0&1\\0&-1\\-1&0\end{bmatrix}$ |

TABLE 5.3.3A.2-4

Codebook for transmission on antenna ports {40,41,42,43} with v = 3

| Codebook index | Number of layers v = 3 |
|---|---|
| 0–3 | $\frac{1}{2}\begin{bmatrix}1&0&0\\1&0&0\\0&1&0\\0&0&1\end{bmatrix}$ $\frac{1}{2}\begin{bmatrix}1&0&0\\-1&0&0\\0&1&0\\0&0&1\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ |
| 4–7 | $\frac{1}{2}\begin{bmatrix}1&0&0\\0&1&0\\0&0&1\\1&0&0\end{bmatrix}$ $\frac{1}{2}\begin{bmatrix}1&0&0\\0&1&0\\0&0&1\\-1&0&0\end{bmatrix}$ $\frac{1}{2}\begin{bmatrix}0&1&0\\1&0&0\\1&0&0\\0&0&1\end{bmatrix}$ $\frac{1}{2}\begin{bmatrix}0&1&0\\1&0&0\\-1&0&0\\0&0&1\end{bmatrix}$ |
| 8–11 | $\frac{1}{2}\begin{bmatrix}0&1&0\\1&0&0\\0&0&1\\1&0&0\end{bmatrix}$ $\frac{1}{2}\begin{bmatrix}0&1&0\\1&0&0\\0&0&1\\-1&0&0\end{bmatrix}$ $\frac{1}{2}\begin{bmatrix}0&1&0\\0&0&1\\1&0&0\\1&0&0\end{bmatrix}$ $\frac{1}{2}\begin{bmatrix}0&1&0\\0&0&1\\1&0&0\\-1&0&0\end{bmatrix}$ |

TABLE 5.3.3A.2-5

Codebook for transmission on antenna ports {40,41,42,43} with v = 4

| Codebook index | Number of layers v = 2 |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Portions of 3GPP TS 36.213 V15.8.0 are quoted below:

Physical Uplink Shared Channel Related Procedures

< . . . >

For a non-BL/CE UE, and for FDD and transmission mode 1 and a cell that is not a LAA SCell, there shall be 16 uplink HARQ processes per serving cell configured with higher layer parameter ul-STTI-Length, otherwise 8 uplink HARQ processes per serving cell for non-subframe bundling operation, i.e. normal HARQ operation <. . . > For a non-BL/CE UE, and for FDD and transmission mode 2 configured for subframe-PUSCH and a cell that is not a LAA SCell, there shall be 32 uplink HARQ processes per serving cell configured with higher layer parameters ul-STTI-Length and shortProcessingTime, otherwise 16 uplink HARQ processes per serving cell for non-subframe bundling operation and there are two HARQ processes associated with a given subframe for subframe-PUSCH as described in [8].

< . . . >

For a serving cell that is not a LAA SCell, and for FDD and normal HARQ operation, the UE shall upon detection on a given serving cell of a PDCCH/EPDCCH with DCI format 0/4 and/or a PHICH transmission in subframe n intended for the UE, perform a corresponding PUSCH transmission in subframe n+$k_p$ according to the PDCCH/EPDCCH and PHICH information where $k_p$=3 if the UE is configured with higher layer parameter shortProcessingTime and the corresponding PDCCH with CRC scrambled by C-RNTI is in the UE-specific search space, $k_p$=4 otherwise.

< . . . > if a transport block corresponding to the HARQ process of the PUSCH transmission is generated as described in [8].

< . . . >

If a UE is configured by higher layers to decode PDCCHs with the CRC scrambled by the C-RNTI, the UE shall decode the PDCCH according to the combination defined in Table 8-3 and transmit the corresponding PUSCH if a transport block corresponding to the HARQ process of the PUSCH transmission is generated as described in [8].

< . . . >

Transmission mode 1 is the default uplink transmission mode for a UE until the UE is assigned an uplink transmission mode by higher layer signalling.

When a UE configured in transmission mode 2 receives a DCI Format 0/0A/0B/0C uplink scheduling grant, it shall assume that the PUSCH transmission is associated with transport block 1 and that transport block 2 is disabled.

TABLE 8-3

PDCCH and PUSCH configured by C-RNTI

| Transmission mode | DCI format | Search Space | Transmission scheme of PUSCH corresponding to PDCCH |
|---|---|---|---|
| Mode 1 | DCI format 0 | Common and UE specific by C-RNTI | Single-antenna port, port 10 (see Subclause 8.0.1) |
| | DCI format 0A or 0B or 0C or 7-0A | UE specific by C-RNTI | Single-antenna port, port 10 (see Subclause 8.0.1) |
| Mode 2 | DCI format 0 | Common and UE specific by C-RNTI | Single-antenna port, port 10 (see Subclause 8.0.1) |
| | DCI format 0A or 0B or 0C | UE specific by C-RNTI | Single-antenna port, port 10 (see Subclause 8.0.1) |
| | DCI format 4 or 4A or 4B or 7-0B | UE specific by C-RNTI | Closed-loop spatial multiplexing (see Subclause 8.0.2) |

8.6.2 Transport Block Size Determination

For a non-BL/CE UE and for $0 \leq I_{MCS} \leq 28$, the UE shall first determine the TBS index ($I_{TBS}$) using $I_{MCS}$ except if the transport block is disabled in DCI format 4/4A/4B as specified below.

< . . . >

In DCI format 4 a transport block is disabled if either the combination of $I_{MCS}=0$ and $N_{PRB}>1$ or the combination of $I_{MCS}=28$ and $N_{PRB}=1$ is signalled, otherwise the transport block is enabled.

Portions of 3GPP TS 36.212 V15.8.0 are quoted below:

5.3.3.1.8 Format 4

DCI format 4 is used for the scheduling of PUSCH in one UL cell with multi-antenna port transmission mode, The following information is transmitted by means of the DCI format 4:

Carrier indicator –0 or 3 bits. The field is present according to the definitions in [3].

Resource block assignment $$\max\left(\lceil \log_2(N_{RB}^{UL}(N_{RB}^{UL}+1)/2) \rceil, \left\lceil \log_2\left(\binom{\lceil N_{RB}^{UL}/P+1 \rceil}{4}\right) \right\rceil\right)$$

bits, where

P is the UL RBG size as defined in subclause 8.1.2 of [3]

< . . . >

In addition, for transport block 1:

Modulation and coding scheme and redundancy version—5 bits as defined in subclause 8.6 of [3]

New data indicator—1 bit

In addition, for transport block 2:

Modulation and coding scheme and redundancy version—5 bits as defined in subclause 8.6 of [3]

New data indicator—1 bit

Precoding information and number of layers: number of bits as specified in Table 5.3.3.1.8-1. Bit field as shown in Table 5.3.3.1.8-2 and Table 5.3.3.1.8-3.

< . . . >

TABLE 5.3.3.1.8-1

Number of bits for precoding information

| Number of antenna ports at UE | Number of bits for precoding information |
|---|---|
| 2 | 3 |
| 4 | 6 |

TABLE 5.3.3.1.8-2

Content of precoding information field for 2 antenna ports

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPM1 = 0 | 0 | 2 layers: TPM1 = 0 |
| 1 | 1 layer: TPM1 = 1 | 1-7 | reserved |
| 2 | 1 layer: TPM1 = 2 | | |
| ... | ... | | |
| 5 | 1 layer: TPM1 = 5 | | |
| 6-7 | reserved | | |

TABLE 5.3.3.1.8-3

Content of precoding information field for 4 antenna ports

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| ... | ... | ... | ... |
| 23 | 1 layer: TPMI = 23 | 15 | 2 layers: TPM1 = 15 |
| 24 | 2 layers: TPMI = 0 | 16 | 3 layers: TPMI = 0 |
| 25 | 2 layers: TPMI = 1 | 17 | 3 layers: TPMI = 1 |
| ... | ... | ... | ... |
| 39 | 2 layers: TPMI = 15 | 27 | 3 layers: TPMI = 11 |
| 40-63 | reserved | 28 | 4 layers: TPMI = 0 |
| | | 29-63 | Reserved |

In LTE, a Medium Access Control (MAC) of a UE can receive an uplink (UL) grant dynamically on a Physical Downlink Control Channel (PDCCH). Alternatively and/or additionally, the MAC of the UE may receive an UL grant in a Random Access Response. Alternatively and/or additionally, an UL grant may be configured (for the MAC and/or the UE, for example) semi-persistently. A Hybrid Automatic Repeat Request (HARQ) entity (in the MAC, for example) may maintain HARQ processes (e.g., multiple parallel HARQ process, such as amounting to a first number of HARQ processes). The HARQ entity may identify HARQ processes (e.g., the HARQ processes maintained by the HARQ entity) associated with UL grants for Transmission Time Intervals (TTIs). For example, each HARQ process of the identified HARQ processes may be associated with a UL grant (of the UL grants, for example) for a TTI (of the TTIs, for example). In an example, each UL grant (for a TTI of the TTIs, for example) of the UL grants may be associated with a HARQ process of the identified HARQ processes. The HARQ entity may obtain a MAC Protocol Data Unit (PDU) from a Msg3 buffer and/or a Multiplexing and assembly entity for a HARQ process (e.g., an identified HARQ process of the identified HARQ processes). If the Multiplexing and assembly entity does not generate a MAC PDU (such as according to a Logical Channel Prioritization (LCP) procedure), the HARQ entity may flush a related HARQ process buffer (associated with the identified HARQ process, for example). A MAC PDU may not be generated if there is no available data for transmission, when skipUplinkTxDynamic is configured for dynamic UL grant (addressed to a Cell Radio Network Temporary Identifier (C-RNTI), for example) and/or skipUplinkTxSPS is configured for configured UL grant (addressed to a Semi-Persistent Scheduling C-RNTI, for example). UL skipping (e.g., skipUplinkTxDynamic and/or skipUplinkTxSPS) is configured by the RRC.

When the UE is configured for UL spatial multiplexing, the MAC may receive two dynamic UL grants for a TTI from lower layer, e.g., physical layer (PHY). The HARQ entity may identify two HARQ processes (or a different number of HARQ processes) for the TTI. The HARQ entity may obtain a MAC PDU for each of the two HARQ processes. The MAC may transmit (after obtaining two MAC PDUs for the two HARQ processes, for example) the two MAC PDUs as transport blocks (TBs) to the PHY for the TTI. However, if there is not enough available data for the TTI and skipUplinkTxDynamic is configured in the UE (e.g., if one UL grant of the two dynamic UL grants accommodates available data and there is merely padding left for another UL grant of the two dynamic UL grants), the Multiplexing and assembly entity may generate only one MAC PDU such as due to the UE not generating a MAC PDU comprising merely padding when skipUplinkTxDynamic is configured (and/or due to there being no aperiodic Channel State Information (CSI) requested for the TTI). For example, UL skipping for the two dynamic UL grants may be examined and/or implemented separately. The MAC may transmit only one transport block to the PHY although the MAC receives two UL grants with UL spatial multiplexing. UL skipping may be applied for one UL grant while UL skipping is not applied to another UL grant. The PHY may expect two transport blocks (or two codewords) when there are two dynamic UL grants for a TTI. For example, 4 layer UL transmission may be indicated (with two transport blocks enabled, for example) for the TTI and/or the PHY may expect there to be two transport blocks generated with each transport block of the two transport blocks mapped to two layers. The PHY may be unable to generate a 4 layer transmission properly with merely one transport block (e.g., with a precoder for spatial multiplexing)

$$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

To solve one or more of the aforementioned issues (e.g., at least one of an issue that a MAC of a UE transmits merely one transport block to a PHY even though the MAC receives two UL grants with UL spatial multiplexing, where the PHY may expect two transport blocks, an issue that the PHY may be unable to generate a 4 layer transmission properly with merely one transport block, etc.), it may not be allowed (for a network, for example) to provide a configuration (and/or any configuration) that causes a UE to be configured with (and/or to implement) UL spatial multiplexing and UL transmission skipping (simultaneously and/or concurrently, for example). Alternatively and/or additionally, it may be allowed (for the network, for example) to provide a configuration (and/or any configuration) that causes a UE to be configured with (and/or to implement) UL spatial multiplexing without UL transmission skipping. Alternatively and/or additionally, it may be allowed (for the network, for example) to provide a configuration (and/or any configuration) that causes a UE to be configured with (and/or to implement) UL transmission skipping without UL spatial multiplexing.

For example, the network may not be allowed and/or configured to configure the UE to simultaneously and/or concurrently execute and/or enable UL spatial multiplexing and UL transmission skipping. In some examples, the network may be allowed and/or configured to configure the UE to execute and/or enable UL spatial multiplexing during a time at which the UE does not execute and/or enable UL transmission skipping (e.g., the network may provide the UE with a configuration indicative of executing and/or enabling UL spatial multiplexing at a time and/or not executing and/or enabling UL transmission skipping at the time). Alternatively and/or additionally, the network may be allowed and/or configured to configure the UE to execute and/or enable UL transmission skipping during a time at which the UE does not execute and/or enable UL spatial multiplexing (e.g., the network may provide the UE with a configuration indicative of executing and/or enabling UL transmission skipping at a time and/or not executing and/or enabling UL spatial multiplexing at the time).

In some examples, if a UE is configured for UL spatial multiplexing (e.g., configured in UL transmission mode 2), the NW may not provide the UE with a configuration (and/or any configuration) having a first parameter set to true that indicates UL skipping (e.g., skip UplinkTxDynamic) in RRC configuration. For example, the network may not configure the UE with a first parameter, indicative of UL skipping (e.g., skipUplinkTxDynamic), when the UL spatial multiplexing is configured for the UE (and/or when the UL spatial multiplexing is configured for the UE, the network may not set the first parameter to a value indicative of UL skipping being enabled and/or true). For example, the network may configure the UE with a first parameter, indicative of not configuring and/or executing UL skipping (e.g., skip UplinkTxDynamic), when the UL spatial multiplexing is configured for the UE (and/or the network may set the first parameter to a value indicative of UL skipping being false when the UL spatial multiplexing is configured for the UE).

In some examples, if a first parameter to indicate UL skipping (e.g., skip UplinkTxDynamic) in RRC configuration is set to true, the network may not provide a configuration (and/or any configuration) such that the UE is configured for UL spatial multiplexing (e.g., configured in UL transmission mode 2). For example, the network may not configure UL spatial multiplexing if a first parameter to indicate UL skipping (e.g., skip UplinkTxDynamic) is configured for the UE. Alternatively and/or additionally, the network may not configure the UL spatial multiplexing if the value of a first parameter to indicate UL skipping (e.g., skip UplinkTxDynamic) is configured as true for the UE.

In an example, the network may configure UL spatial multiplexing and may not configure a first parameter to indicate UL skipping (e.g., skip UplinkTxDynamic) to the UE. The UE may receive two UL grants for a TTI. Because a first parameter to indicate UL skipping (e.g., skip UplinkTxDynamic) is not configured for the UE (and/or because the UE is not configured with UL skipping when the UE receives the two UL grants), the UE may generate two MAC PDUs even though the UE may have less than a threshold amount of available data for the TTI. In some examples, the threshold amount of available data may correspond to an amount of available data accommodated by an UL grant of the two UL grants. For example, an amount of available data of the UE being less than the threshold amount of available data may indicate that the UE does not have enough available data for the TTI and/or the two UL grants (e.g., merely one UL grant of the two UL grants may accommodate all the available data). One and/or both of the two MAC PDUs associated with the TTI may merely comprise padding Buffer Status Report (BSR), and/or periodic BSR with zero MAC Service Data Units (SDUs).

In some examples, the network may configure the UE with UL spatial multiplexing and UL skipping. In some examples, the network is not allowed (and/or is not configured) to indicate to and/or instruct (via a DCI, for example) the UE to perform UL transmission with two transport blocks if (and/or when) the network configures the UE with UL spatial multiplexing and UL skipping (and/or if and/or when the UE is configured with UL spatial multiplexing and UL skipping). In some examples, the network is not allowed (and/or is not configured) to indicate, to the UE (via a DCI, for example), two UL grants for a first TTI if (and/or when) the network configures the UE with UL spatial multiplexing and UL skipping (and/or if and/or when the UE is configured with UL spatial multiplexing and UL skipping). In some examples, the network is not allowed (and/or is not configured) to indicate to and/or instruct (via a DCI, for example) the UE to enable both transport blocks of two transport blocks if (and/or when) the network configures the UE with UL spatial multiplexing and UL skipping (and/or if and/or when the UE is configured with UL spatial multiplexing and UL skipping). In some examples, the network is not allowed (and/or is not configured) to indicate (via a DCI format associated with spatial multiplexing, for example), to the UE, a first combination of $I_{MCS}=0$ and $N_{PRB}>1$ nor a second combination of $I_{MCS}=28$ and $N_{PRB}=1$, for two transport blocks (and/or for both transport blocks of the two transport blocks) if (and/or when) the network configures the UE with UL spatial multiplexing and UL skipping (and/or if and/or when the UE is configured with UL spatial multiplexing and UL skipping). In some examples, $I_{MCS}$, as used herein, may be indicative of a modulation and coding scheme to be used for an UL transmission. In some examples, $N_{PRB}$, as used herein, may be indicative of a number of resource blocks to be used for an UL transmission. In some examples, the DCI format associated with spatial multiplexing indicates that a transport block of the two transport blocks is disabled. In some examples, the network shall indicate to and/or instruct (via a DCI, for example) the UE to perform UL transmission with a single transport block (e.g., only one transport block) if (and/or when) the network configures the UE with UL spatial multiplexing and UL skipping (and/or if and/or when the UE is configured with UL spatial multiplexing and UL skipping). In some examples, the network shall indicate to and/or instruct (via a DCI, for example) the UE to enable a single transport block if (and/or when) the network configures the UE with UL spatial multiplexing and UL skipping (and/or if and/or when the UE is configured with UL spatial multiplexing and UL skipping). In some examples, the network shall indicate to and/or instruct (via a DCI, for example) the UE to disable the one transport block if (and/or when) the network configures the UE with UL spatial multiplexing and UL skipping (and/or if and/or when the UE is configured with UL spatial multiplexing and UL skipping). In some examples, the network shall indicate (via a DCI format associated with spatial multiplexing, for example), to the UE, either a first combination of $I_{MCS}=0$ and $N_{PRB}>1$ or a second combination of $I_{MCS}=28$ and $N_{PRB}=1$ for a transport block if (and/or when) the network configures the UE with UL spatial multiplexing and UL skipping (and/or if and/or when the UE is configured with UL spatial multiplexing and UL skipping). In some examples, the network shall schedule the UE with DCI format 0 or schedule the UE with a DCI format associated with spatial multiplexing if (and/or when) the network configures the UE with UL spatial multiplexing and UL skipping (and/or if and/or when the UE is configured with UL spatial multiplexing and UL skipping), wherein either a first combination of $I_{MCS}=0$ and $N_{PRB}>1$ or a second combination of $I_{MCS}=28$ and $N_{PRB}=1$ for a transport block is signaled and/or indicated in the DCI format associated with spatial multiplexing.

In some examples, the network may configure the UE with UL spatial multiplexing and UL skipping. In some examples, the network is not allowed (and/or is not configured) enable spatial multiplexing for the UE with DCI if (and/or when) the network configures the UE with UL spatial multiplexing and UL skipping (and/or if and/or when the UE is configured with UL spatial multiplexing and UL skipping). In some examples, the network is not allowed (and/or is not configured) to indicate to and/or instruct (via a DCI, for example) the UE to perform UL transmission with spatial multiplexing if (and/or when) the network configures the UE with UL spatial multiplexing and UL skipping (and/or if and/or when the UE is configured with UL spatial multiplexing and UL skipping). In some examples, the network is not allowed (and/or is not configured) to schedule the UE with a DCI format associated with spatial multiplexing (e.g., scheduling the UE with a DCI format associated with spatial multiplexing may cause the UE perform UL transmission with multiple antenna ports) if (and/or when) the network configures the UE with UL spatial multiplexing and UL skipping (and/or if and/or when the UE is configured with UL spatial multiplexing and UL skipping). In some examples, the network shall indicate to and/or instruct (via a DCI, for example) the UE to perform UL transmission without spatial multiplexing if (and/or when) the network configures the UE with UL spatial multiplexing and UL skipping (and/or if and/or when the UE is configured with UL spatial multiplexing and UL skipping). In some examples, the network shall indicate to and/or instruct (via a DCI, for example) the UE to perform UL transmission with a single antenna port if (and/or when) the network configures the UE with UL spatial multiplexing and UL skipping (and/or if and/or when the UE is configured with UL spatial multiplexing and UL skipping). In some examples, the network shall schedule the UE with DCI format 0 (to perform UL transmission with a single antenna port, for example) if (and/or when) the network configures the UE with UL spatial multiplexing and UL skipping (and/or if and/or when the UE is configured with UL spatial multiplexing and UL skipping).

In some examples, one, some and/or all of the above restrictions to network configuration and/or network indication may be applied if (and/or when) the network is unsure about and/or does not know available data of the UE (e.g., available data at the UE side) and/or if (and/or when) the network determines (and/or realizes) that an amount of available data of the UE (e.g., an amount of available data at the UE side) is smaller than a threshold amount of data. In some examples, one, some and/or all of the above restrictions to network configuration and/or network indication may not be applied if (and/or when) the network determines (and/or realizes) that an amount of available data of the UE (e.g., an amount of available data at the UE side) is larger than the threshold amount of data. In some examples, the network may determine (and/or realize) the amount of available data of the UE based on a buffer status report from a UE. In some examples, one, some and/or all of the above restrictions to network configuration and/or network indication may be applied if (and/or when) the network does not receive a buffer status report from the UE (and/or the network has not received a buffer status report from the UE for over a threshold duration of time), if (and/or when) the network does not have a latest (e.g., most recent) buffer status information of the UE, if (and/or when) the network receives a scheduling request from the UE, if (and/or when) the network schedules the UE in response to a scheduling request from the UE, if (and/or when) the network receives a buffer status report, associated with the UE, that is indicative of an amount of available data smaller than a threshold amount of data, if (and/or when) the network receives a buffer status report, associated with the UE, that is indicative of an amount of available data that is smaller than a size of one transport block, and/or if (and/or when) the network receives a buffer status report, associated with the UE, that is indicative of an amount of available data that results in data (e.g., available data of the UE, such as all available data of the UE) being included in a single transport block while no data (e.g., no available data of the UE) is included in another transport block. In some examples, one, some and/or all of the above restrictions to network configuration and/or network indication may not be applied if (and/or when) the network receives a buffer status report, associated with the UE, that is indicative of an amount of available data larger than a threshold amount of data, if (and/or when) the network receives a buffer status report, associated with the UE, that is indicative of an amount of available data larger than a size of one transport block, and/or if (and/or when) the network receives a buffer status report, associated with the UE, that is indicative of an amount of available data that results in data (e.g., the available data of the UE) being included in both transport blocks of the two transport blocks (such as where a first portion of the available data is included in a first transport block of the two transport blocks and a second portion of the available data is included in a second transport block of the two transport blocks).

In one embodiment, the network may configure the UE with UL spatial multiplexing and UL skipping. In some examples, if (and/or when) one or more first conditions are met: the network is not allowed (and/or is not configured) to indicate to and/or instruct (via a DCI, for example) the UE to perform UL transmission with two transport blocks; and/or the network is not allowed (and/or is not configured) to indicate, to the UE (via a DCI, for example), two UL grants for a first TTI; and/or the network is not allowed (and/or is not configured) to indicate to and/or instruct (via a DCI, for example) the UE to enable both transport blocks of two transport blocks; and/or the network is not allowed (and/or is not configured) to indicate (via a DCI format associated with spatial multiplexing, for example), to the UE, neither a first combination of $I_{MCS}=0$ and $N_{PRB}>1$ nor a second combination of $I_{MCS}=28$ and $N_{PRB}=1$, for two transport blocks (and/or for both transport blocks of the two transport blocks); and/or the network is not allowed (and/or is not configured) to enable, with DCI, spatial multiplexing for the UE; and/or the network is not allowed (and/or is not configured) to indicate to and/or instruct (via a DCI, for example) the UE to perform UL transmission with spatial multiplexing; and/or the network is not allowed (and/or is not configured) to schedule the UE with a DCI format associated with spatial multiplexing (e.g., scheduling the UE with a DCI format associated with spatial multiplexing may cause the UE perform UL transmission with multiple antenna ports); and/or the network shall indicate to and/or instruct (via a DCI, for example) the UE to perform UL transmission with a single transport block; and/or the network shall enable a single transport block (e.g., one transport block of two transport blocks), such as enable a single transport block associated with the UE; and/or the network shall indicate to and/or instruct (via a DCI, for example) the UE to enable a single transport block; and/or the network shall disable one transport block (e.g., one transport block of two transport blocks), such as one transport block associated with the UE; and/or the network shall indicate to and/or instruct (via a DCI, for example) the UE to disable one transport block; and/or the network shall indicate (via a DCI format associated with spatial multiplexing, for example), to the UE, either a first combination of $I_{MCS}=0$ and $N_{PRB}>1$ or a second combination of $I_{MCS}=28$ and $N_{PRB}=1$ for a transport block; and/or shall schedule the UE with a DCI format 0 or a DCI format associated with spatial multiplexing wherein either a first combination of $I_{MCS}=0$ and $N_{PRB}>1$ or a second combination of $I_{MCS}=28$ and $N_{PRB}=1$ for a transport block is signaled and/or indicated in the DCI format associated with spatial multiplexing; and/or the network shall indicate to and/or shall instruct (via a DCI, for example) the UE to perform UL transmission without spatial multiplexing; and/or the network shall indicate to and/or shall instruct (via a DCI, for example) the UE to perform UL transmission with a single antenna port; and/or shall schedule the UE with a DCI format 0, wherein the one or more first conditions may comprise a condition that is met if (and/or when) the network is unsure about available data of the UE (e.g., available data at the UE side), a condition that is met if (and/or when) the network does not know and/or determine an amount of available data of the UE (e.g., an amount of available data at the UE side), a condition that is met if (and/or when) the network determines (and/or realizes) that an amount of available data of the UE (e.g., an amount of available data at the UE side) is smaller than a threshold amount of data, a condition that is met if (and/or when) the network does not receive (and/or has not received) a buffer status report from the UE (for over a threshold duration of time, for example), a condition that is met if (and/or when) the network does not have a latest (e.g., most recent) buffer status information of the UE, a condition that is met if (and/or when) the network receives a scheduling request from the UE, a condition that is met if (and/or when) the network schedules the UE in response to a scheduling request from the UE, a condition that is met if (and/or when) the UE is scheduled by the network in response to a scheduling request from the UE, a condition that is met if (and/or when) the network receives a buffer status report, associated with the UE, that is indicative of an amount of available data smaller than a threshold amount of data, a condition that is met if (and/or when) the network receives a buffer status report, associated with the UE, that is indicative of an amount of available data that is smaller than a size of one transport block, a condition that is met if (and/or when) the network receives a buffer status report, associated with the UE, that is indicative of an amount of available data that results in data (e.g., available data of the UE, such as all available data of the UE) being included in a single transport block while no data (e.g., no available data of the UE) is included in another transport block, a condition that is met if (and/or when) the network configures the UE with UL spatial multiplexing and UL skipping, and/or a condition that is met if (and/or when) the UE is configured (by the network, for example) with UL spatial multiplexing and UL skipping. In some examples, if (and/or when) one or more second conditions are met: the network may indicate to and/or instruct (via a DCI, for example) the UE to perform UL transmission with two transport blocks; and/or the network may indicate, to the UE (via a DCI, for example), two UL grants for a second TTI; and/or the network may indicate to and/or instruct (via a DCI, for example) the UE to enable both transport blocks of two transport blocks; and/or the network may transmit an indication to the UE (via a DCI format associated with spatial multiplexing, for example) so that neither a first combination of $I_{MCS}=0$ and $N_{PRB}>1$ nor a second combination of $I_{MCS}=28$ and $N_{PRB}=1$ are satisfied for one transport block (of two transport blocks, for example); and/or the network may enable, with DCI, spatial multiplexing for the UE; and/or the network may indicate to and/or instruct (via a DCI, for example) the UE to perform UL transmission with spatial multiplexing and/or with multiple antenna ports; and/or the network may schedule the UE with a DCI format associated with spatial multiplexing (e.g., scheduling the UE with a DCI format associated with spatial multiplexing may cause the UE perform UL transmission with multiple antenna ports), wherein the one or more second conditions may comprise a condition that is met if (and/or when) the network determines (and/or realizes) that an amount of available data of the UE (e.g., an amount of available data at the UE side) is larger than a threshold amount of data, a condition that is met if (and/or when) the network receives a buffer status report, associated with the UE, that is indicative of an amount of available data larger than a threshold amount of data, a condition that is met if (and/or when) the network receives a buffer status report, associated with the UE, that is indicative of an amount of available data larger than a size of one transport block, a condition that is met if (and/or when) the network receives a buffer status report, associated with the UE, that is indicative of an amount of available data that results in data (e.g., the available data of the UE) being included in both transport blocks of the two transport blocks (such as where a first portion of the available data is included in a first transport block of the two transport blocks and a second portion of the available data is included in a second transport block of the two transport blocks), a condition that is met if (and/or when) the network configures the UE with UL spatial multiplexing and UL skipping, and/or a condition that is met if (and/or when) the UE is configured (by the network, for example) with UL spatial multiplexing and UL skipping. Alternatively and/or additionally, if (and/or when) the one or more second conditions are met, the network may be allowed (and/or configured) to: indicate to and/or instruct (via a DCI, for example) the UE to perform UL transmission with two transport blocks; and/or indicate, to the UE (via a DCI, for example), two UL grants for a TTI; and/or indicate to and/or instruct (via a DCI, for example) the UE to enable both transport blocks of two transport blocks.

In some examples, the network may configure UL spatial multiplexing by configuring transmission mode 2 (for uplink, for example). For example, the network may configure the UE with transmission mode 2 (for uplink, for example).

Throughout the present disclosure, one, some, and/or all instances of "configure UL spatial multiplexing" and/or "configure the UE with UL spatial multiplexing" may correspond to, may be supplemented with and/or may be replaced by "configure transmission mode 2 (for uplink, for example)" and/or "configure the UE with transmission mode 2 (for uplink, for example)", respectively.

Throughout the present disclosure, one, some, and/or all instances of "TTI" may comprise and/or may be a subframe, a slot, a subslot, short TTI (sTTI), 2 symbols, 3 symbols, and/or 7 symbols (and/or a different number of symbols).

Throughout the present disclosure, one, some, and/or all instances of "UL transmission" may comprise and/or may be a PUSCH transmission.

Throughout the present disclosure, one, some, and/or all instances of "is not allowed to" may correspond to, may be supplemented with and/or may be replaced by "prevents", "is prevented from", "prohibits" and/or "is prohibited from". In an example, "the network is not allowed to perform a first action" may be replaced by and/or may be supplemented with "the network prevents performance of the first action", "the network is prevented from performing the first action", "the network prohibits performance of the first action", and/or "the network is prohibited from performing the first action".

Throughout the present disclosure, one, some, and/or all instances of "the network is not allowed to (and/or is not configured to) configure" may correspond to, may be supplemented with and/or may be replaced by "the UE is not expected to be configured". In an example, "the network is not allowed to (and/or is not configured to) configure the UE with a first configuration" may be replaced by and/or may be supplemented with "the UE is not expected to be configured with the first configuration".

Throughout the present disclosure, one, some and/or all instances of "the network is not allowed to (and/or is not configured to) indicate and/or instruct" may correspond to, may be supplemented with and/or may be replaced by "the UE is not expected to be indicated and/or instructed". In an example, "the network is not allowed to (and/or is not configured to) indicate to and/or instruct the UE to perform a first action" may be replaced by and/or may be supplemented with "the UE is not expected to be indicated to and/or instructed to perform the first action".

Throughout the present disclosure, one, some and/or all instances of "the network is not allowed to (and/or is not configured to) schedule" may correspond to, may be supplemented with and/or may be replaced by "the UE is not expected to be scheduled". In an example, "the network is not allowed to (and/or is not configured to) schedule the UE with a DCI format" may be replaced by and/or may be supplemented with "the UE is not expected to be scheduled with the DCI format".

Throughout the present disclosure, one, some and/or all instances of "TTI" may correspond to and/or may be replaced by "given TTI".

With respect to one or more embodiments of the present disclosure, the UE may be configured by the network with a single cell.

Throughout the present disclosure, UL grants associated with a TTI, UL grants for a TTI and/or UL grants at a TTI may be used interchangeably. With respect to one or more embodiments of the present disclosure, UL grants associated with a TTI, UL grants for a TTI and/or UL grants at a TTI may be for one serving cell (e.g., for a HARQ entity).

Throughout the present disclosure, UL grants associated with a TTI, UL grants for a TTI and/or UL grants at a TTI may be used interchangeably. With respect to one or more embodiments of the present disclosure, UL grants associated with a TTI, UL grants for a TTI and/or UL grants at a TTI may correspond to UL grants received for the TTI.

Throughout the present disclosure, MAC PDUs associated with a TTI, MAC PDUs for a TTI and/or MAC PDUs at a TTI may be used interchangeably. With respect to one or more embodiments of the present disclosure, MAC PDUs associated with a TTI, MAC PDUs for a TTI and/or MAC PDUs at a TTI may correspond to MAC PDUs that are generated for transmission via UL grants received for the TTI.

Throughout the present disclosure, for the TTI, at the TTI and/or associated with the TTI may be used interchangeably.

To solve one or more of the aforementioned issues (e.g., at least one of an issue that a MAC of a UE transmits merely one transport block to a PHY even though the MAC receives two UL grants with UL spatial multiplexing, where the PHY may expect two transport blocks, an issue that the PHY may be unable to generate a 4 layer transmission properly with merely one transport block, etc.), the UE may not skip an UL transmission (and/or any UL transmission) for UL spatial multiplexing. The UE may not skip UL transmission and/or may generate two MAC PDUs for a TTI when and/or if the UE receives two UL grants for the TTI (and/or the UE may not skip UL transmission and/or may generate two MAC PDUs for a TTI in response to receiving two UL grants for the TTI). The UE may not skip UL transmission and/or may generate two MAC PDUs for a TTI when the UE is configured for UL spatial multiplexing. The UE may not skip UL transmission and/or may generate two MAC PDUs for a TTI when and/or if UL grants associated with the TTI are for spatial multiplexing transmission. The UE may not skip UL transmission and/or may generate two MAC PDUs for a TTI when and/or if the UE receives two UL grants for the TTI and a first UL grant of the two UL grants is able to accommodate available data of the UE (and/or if a first MAC PDU of the two MAC PDUs accommodates the available data of the UE and there is merely padding left for inclusion in a second MAC PDU of the two MAC PDUs). The UE may not skip UL transmission and/or may generate two MAC PDUs for a TTI when and/or if the UE receives two UL grants for the TTI and a first MAC PDU of the two MAC PDUs (and/or a MAC PDU associated with a first UL grant of the two UL grants) merely comprises padding. The UE may not skip UL transmission and/or may generate two MAC PDUs for a TTI when and/or if the UE receives two UL grants for the TTI and a first MAC PDU of the two MAC PDUs (and/or a MAC PDU associated with a first UL grant of the two UL grants) merely comprises a MAC CE, for a padding BSR or a periodic BSR, with zero MAC SDUs (where the first MAC PDU and/or the MAC CE do not comprise any MAC SDUs). The UE may not skip UL transmission and/or may generate two MAC PDUs for a TTI when and/or if the UE receives two UL grants for the TTI and a first UL grant of the two UL grants is able to accommodate available data (e.g., all available data) of the UE (and/or if a first MAC PDU of the two MAC PDUs accommodates the available data (e.g., all available data of the UE) and there is merely padding left for inclusion in a second MAC PDU of the two MAC PDUs). The UE may not skip UL transmission and/or may generate two MAC PDUs for a TTI when and/or if the UE receives two UL grants for the TTI, a first MAC PDU of the two MAC PDUs (and/or a MAC PDU associated with a first UL grant of the two UL grants) merely comprises a MAC CE for a padding BSR or a periodic BSR with zero MAC SDUs (where the first MAC PDU and/or the MAC CE do not comprise any MAC SDUs), and a second MAC PDU of the two MAC PDUs (and/or a MAC PDU associated with a second UL grant of the two UL grants) comprises data (e.g., available data of the UE) or a MAC SDU.

In some examples, a Multiplexing and assembly entity may separate and/or split available data of the UE into MAC PDUs (e.g., two MAC PDUs) associated with a TTI (and/or the MAC PDUs for the TTI and/or at the TTI). The UE may separate and/or split padding (and/or a MAC CE, for padding BSR and/or periodic BSR, with zero MAC SDUs) to the MAC PDUs associated with a TTI. In some examples, the UE ensures that each of the MAC PDUs (e.g., both of the two MAC PDUs) comprises UE data. Alternatively and/or additionally, the UE may ensure that each of the MAC PDUs (e.g., both of the two MAC PDUs) comprises one or more MAC SDUs. Alternatively and/or additionally, the UE may ensure that each of the MAC PDUs (e.g., both of the two MAC PDUs) comprises data and padding. Alternatively and/or additionally, the UE may ensure that each of the MAC PDUs (e.g., both of the two MAC PDUs) comprises a MAC PDU and at least one of padding, a MAC CE for padding BSR, a periodic BSR with zero MAC SDUs, etc. Alternatively and/or additionally, the UE may ensure that each of the MAC PDUs (e.g., both of the two MAC PDUs) does not merely comprise padding (e.g., the UE may ensure that each of the MAC PDUs, such as both of the two MAC PDUs, comprises data other than padding). Alternatively and/or additionally, the UE may ensure that the MAC PDUs do not merely comprise padding (e.g., the UE may ensure that at least one of the MAC PDUs, comprises data other than padding). Alternatively and/or additionally, the UE may ensure that each of the MAC PDUs (e.g., both of the two MAC PDUs) do not merely comprise a MAC CE for padding BSR and/or do not merely comprise a MAC CE for periodic BSR with zero MAC SDUs. Alternatively and/or additionally, the UE may ensure that the MAC PDUs do not merely comprise a MAC CE for padding BSR and/or do not merely comprise a MAC CE for periodic BSR with zero MAC SDUs (e.g., the UE may ensure that at least one of the MAC PDUs, comprises data other than a MAC CE for padding BSR and/or a MAC CE for periodic BSR with zero MAC SDUs). In an example, a MAC PDU of the MAC PDUs may accommodate available data (e.g., all available data) of the UE. In some examples, the UE ensures that each of the MAC PDUs (e.g., both of the two MAC PDUs) comprises UE data even if one MAC PDU of the MAC PDUs can accommodate the available data (e.g., all available data of the UE). In some examples, the UE generates two PDUs (e.g., two MAC PDUs) since both of the two PDUs comprise UL data (and/or the UE may generate the two PDUs such that each PDU of the two PDUs comprises UL data, such as where a first PDU of the two PDUs comprises first UL data and a second PDU of the two PDUs comprises second UL data). The UL data may correspond to at least some of the available data of the UE. In some examples, the UE generates two PDUs (e.g., two MAC PDUs) since both of the two PDUs do not merely comprise padding (such as where a first PDU of the two PDUs comprises first data other than padding and/or a second PDU of the two PDUs comprises second data other than padding). In some examples, the UE generates two PDUs (e.g., two MAC PDUs) since both of the two PDUs do not merely comprise a MAC CE, for padding BSR or periodic BSR, with zero MAC SDUs (and/or the UE may generate the two PDUs such that both of the two PDUs do not comprise merely a MAC CE, for padding BSR or periodic BSR, with zero MAC SDUs). The UE may separate and/or split the available data to the MAC PDUs associated with a TTI (and/or the MAC PDUs for the TTI and/or at the TTI) if UL skipping is configured. The UE may separate and/or split padding to the MAC PDUs associated with a TTI (and/or the MAC PDUs for the TTI and/or at the TTI) if UL skipping is configured.

In some examples, the UE does not separate and/or split available data of the UE (e.g., all available data of the UE) to MAC PDUs associated with a TTI (and/or the MAC PDUs for the TTI and/or the MAC PDUs at the TTI) if one MAC PDU cannot accommodate the available data of the UE (e.g., all available data of the UE). In some examples, the UE does not separate and/or split padding (and/or the MAC CE, for padding BSR and/or periodic BSR, with zero MAC SDUs) to MAC PDUs associated with a TTI (and/or the MAC PDUs for the TTI and/or the MAC PDUs at the TTI) if one MAC PDU cannot accommodate available data of the UE (e.g., all available data of the UE). The UE may include data in a first MAC PDU (of two MAC PDUs, for example) and include second data and padding (and/or the MAC CE, for padding BSR and/or periodic BSR, with zero MAC SDUs) in a second MAC PDU (of the two MAC PDUs) if one MAC PDU (of the two MAC PDUs) cannot accommodate available data of the UE (e.g., all available data of the UE). The UE may include first data in a first MAC PDU (of two MAC PDUs, for example) and include second data and padding in a second MAC PDU (of the two MAC PDUs, for example) if the two MAC PDUs can accommodate available data of the UE (e.g., all available data of the UE). In some examples, the UE does not separate and/or split available data of the UE (e.g., all available data of the UE) to MAC PDUs associated with a TTI (and/or the MAC PDUs for the TTI and/or the MAC PDUs at the TTI) if UL skipping is not configured. In some examples, the UE does not separate and/or split padding to MAC PDUs associated with a TTI (and/or the MAC PDUs for the TTI and/or the MAC PDUs at the TTI) if UL skipping is not configured.

In some examples, the Multiplexing and assembly entity may ignore one or more conditions of not generating MAC PDU (e.g., one or more conditions based on which the Multiplexing and assembly entity may not generate a MAC PDU, such as a condition that is met if generating the MAC PDU would result in the MAC PDU comprising no available data of the UE). Alternatively and/or additionally, a HARQ entity may indicate to and/or instruct the Multiplexing and assembly entity to generate a padding MAC PDU (e.g., a MAC PDU comprising padding and/or not comprising available data of the UE). Alternatively and/or additionally, the HARQ entity may obtain the padding MAC PDU from a HARQ process buffer (e.g., a second HARQ process buffer associated with a second HARQ process other than a related HARQ process that is associated with and/or allocated to the TTI and/or a UL grant associated with the padding MAC PDU, where the second HARQ process may be associated with and/or allocated to the TTI and/or a second UL grant for the TTI).

The network may configure the UE with UL spatial multiplexing and a first parameter indicative of UL skipping (e.g., skip UplinkTxDynamic). The UE configured with UL spatial multiplexing may receive two UL grants for a TTI.

Example 1-1: Separate Data to MAC PDUs

In Example 1-1, the UE may allocate available data of the UE separately to MAC PDUs associated with a TTI (and/or the MAC PDUs for the TTI and/or the MAC PDUs at the TTI) when and/or if the UE receives UL grants (e.g., two UL grants) for the TTI. Alternatively and/or additionally, the UE may allocate the available data separately to the MAC PDUs (e.g., the MAC PDUs associated with the TTI, the MAC PDUs for the TTI and/or the MAC PDUs at the TTI) when and/or if the UE is configured for UL spatial multiplexing. Alternatively and/or additionally, the UE may allocate the available data separately to the MAC PDUs (e.g., the MAC PDUs associated with the TTI, the MAC PDUs for the TTI and/or the MAC PDUs at the TTI) when and/or if the UL grants associated with the TTI are for spatial multiplexing transmission.

The UE may allocate UL resources to logical channels that are allowed to transmit (with consideration of the sum of capacities of the UL grants associated with the TTI, for example). The UL resources may be allocated to the logical channels based on the capacities of the UL grants associated with the TTI (e.g., the UL resources may be allocated to the logical channels based on the sum of the capacities). Alternatively and/or additionally, the logical channels may be identified based on the capacities of the UL grants associated with the TTI (e.g., the logical channels may be identified based on the sum of the capacities).

Example 1-2: Generate MAC PDUs when (and/or in Response to) Receiving Two UL Grants Associated with a TTI In Example 1-2, the UE may generate MAC PDUs (e.g., two MAC PDUs) when (and/or in response to) receiving two UL grants associated with a TTI (e.g., the UE may always generate MAC PDUs, such as two MAC PDUs, when (and/or in response to) receiving two UL grants associated with a TTI). For example, the UE may generate MAC PDUs (e.g., two MAC PDUs) associated with a TTI (and/or for the TTI and/or at the TTI), when and/or if the UE receives two UL grants for the TTI, regardless of whether the UE has available data amounting to at least a threshold amount of available data. In some examples, the threshold amount of available data may correspond to an amount of available data accommodated by an UL grant of the two UL grants. For example, an amount of data of the available data of the UE being less than the threshold amount of available data may indicate that the UE does not have enough available data for the TTI and/or the two UL grants (e.g., merely one UL grant of the two UL grants may accommodate all the available data). Alternatively and/or additionally, the UE may generate MAC PDUs associated with a TTI (and/or for the TTI and/or at the TTI), in response to receiving two UL grants for the TTI, regardless of whether the UE has available data amounting to at least the threshold amount of available data. During and/or in accordance with a LCP procedure (performed by the UE for performing an UL transmission, for example), the UE may not generate a MAC PDU if the UE does not have available data, a MAC entity of the UE is configured with a first parameter (e.g., skip UplinkTxDynamic), a grant (e.g., an UL grant received by the UE) is addressed to a C-RNTI, and the UE does not have two UL grants at a TTI (associated with the grant, for example).

Example 1-3: Generate MAC PDUs when Configured for UL Spatial Multiplexing

In Example 1-3, the UE may generate MAC PDUs (e.g., two MAC PDUs) when (and/or if) the UE is configured for UL spatial multiplexing (e.g., the UE may always generate MAC PDUs, such as two MAC PDUs, when (and/or if) the UE is configured for UL spatial multiplexing). For example, the UE may generate MAC PDUs (e.g., two MAC PDUs), regardless of whether the UE has available data amounting to the threshold amount of available data, when (and/or if) the UE is configured for UL spatial multiplexing. During and/or in accordance with a LCP procedure (performed by the UE for performing an UL transmission, for example), the UE may not generate a MAC PDU if the UE does not have available data, a MAC entity of the UE is configured with a first parameter (e.g., skip UplinkTxDynamic), a grant (e.g., an UL grant received by the UE) is addressed to a C-RNTI, and the UE is not configured for UL spatial multiplexing.

Example 1-4: Generate MAC PDUs when the UL Grant is for Spatial Multiplexing Transmission In Example 1-4, the UE may generate MAC PDUs (e.g., two MAC PDUs) when (and/or if) an UL grant (e.g., an UL grant received by the UE) is for spatial multiplexing transmission (e.g., the UE may always generate MAC PDUs, such as two MAC PDUs, when (and/or if) an UL grant is for spatial multiplexing transmission). For example, the UE may generate MAC PDUs (e.g., two MAC PDUs), regardless of whether the UE has available data amounting to the threshold amount of available data, when (and/or if) an UL grant (e.g., an UL grant received by the UE) is for spatial multiplexing transmission. During and/or in accordance with a LCP procedure (performed by the UE for performing an UL transmission, for example), the UE may not generate a MAC PDU if the UE does not have available data, a MAC entity of the UE is configured with a first parameter (e.g., skip UplinkTxDynamic), and a grant (e.g., an UL grant received by the UE) is addressed to a C-RNTI not for UL spatial multiplexing.

Example 1-5: Indicate a Padding MAC PDU when (and/or in Response to) Receiving Two UL Grants for a TTI In Example 1-5, if the UE does not obtain a MAC PDU associated with a TTI (and/or for the TTI and/or at the TTI), the UE may generate a padding MAC PDU when (and/or if) the UE has two UL grants for the TTI (and/or in response to the UE receiving the two UL grants for the TTI). For example, if a MAC PDU to transmit has not been obtained and the UE has two UL grants for the TTI, the UE may indicate to and/or instruct the Multiplexing and assembly entity to generate a padding MAC PDU (e.g., a MAC PDU comprising padding and/or not comprising available data of the UE).

Example 1-6: Indicate a Padding MAC PDU when Configured for UL Spatial Multiplexing In Example 1-6, if the UE does not obtain a MAC PDU associated with a TTI (and/or for the TTI and/or at the TTI), the UE may generate a padding MAC PDU when (and/or if) the UE is configured for UL spatial multiplexing. For example, if a MAC PDU to transmit has not been obtained and a PHY of the UE is configured for UL spatial multiplexing, the UE may indicate to and/or instruct the Multiplexing and assembly entity to generate a padding MAC PDU (e.g., a MAC PDU comprising padding and/or not comprising available data of the UE).

Example 1-7: Indicate a Padding MAC PDU when the UL Grant is for Spatial Multiplexing Transmission In Example 1-7, if the UE does not obtain a MAC PDU associated with a TTI (and/or for the TTI and/or at the TTI) for UL spatial multiplexing, the UE may generate a padding MAC PDU. For example, if a MAC PDU to transmit has not been obtained and a HARQ process (e.g., an identified HARQ process associated with and/or allocated to the TTI and/or an UL grant associated with the MAC PDU) is for UL spatial multiplexing, the UE may indicate to and/or instruct the Multiplexing and assembly entity to generate a padding MAC PDU (e.g., a MAC PDU comprising padding and/or not comprising available data of the UE).

Example 1-8: Obtain the MAC PDU from a Second HARQ Process Buffer when (and/or in Response to) Receiving Two UL Grants for a TTI In Example 1-8, if the UE does not obtain a MAC PDU for the TTI, the UE may obtain a MAC PDU from a second HARQ process buffer when (and/or if) the UE has two UL grants for the TTI (and/or in response to the UE receiving the two UL grants for the TTI). For example, if a MAC PDU to transmit has not been obtained and the UE has the two UL grants for the TTI, the UE may obtain the MAC PDU from the second HARQ process buffer associated with the TTI. In some examples, the second HARQ process buffer may be associated with a second HARQ process other than a related HARQ process that is associated with and/or allocated to the TTI and/or a first UL grant for which the MAC PDU is generated, where the second HARQ process may be associated with and/or allocated to the TTI and/or a second UL grant for the TTI.

Example 1-9: Obtain the MAC PDU from a Second HARQ Process Buffer when Configured for UL Spatial Multiplexing In Example 1-9, if the UE does not obtain a MAC PDU for a TTI, the UE may obtain a MAC PDU from a second HARQ process buffer when (and/or if) the UE is configured for UL spatial multiplexing. For example, if a MAC PDU to transmit has not been obtained and a PHY of the UE is configured for UL spatial multiplexing, the UE may obtain the MAC PDU from the second HARQ process buffer associated with the TTI. In some examples, the second HARQ process buffer may be associated with a second HARQ process other than a related HARQ process that is associated with and/or allocated to the TTI and/or a first UL grant for which the MAC PDU is generated, where the second HARQ process may be associated with and/or allocated to the TTI and/or a second UL grant for the TTI.

Example 1-10: Obtain MAC PDU from a Second HARQ Process Buffer when the UL Grant is for Spatial Multiplexing Transmission In Example 1-10, the UE may obtain a MAC PDU from a second HARQ process buffer if the UE does not obtain a MAC PDU for the TTI for UL spatial multiplexing. For example, if a MAC PDU to transmit has not been obtained and a first HARQ process (e.g., an identified HARQ process associated with and/or allocated to the TTI and/or an UL grant associated with the MAC PDU) is for UL spatial multiplexing, the UE may obtain the MAC PDU from the second HARQ process buffer associated with the TTI. In some examples, the second HARQ process buffer may be associated with a second HARQ process other than the first HARQ process, where the second HARQ process may be associated with and/or allocated to the TTI and/or a second UL grant for the TTI.

In Examples 1-1, 1-2, 1-3, 1-4, 1-5, 1-6, 1-7, 1-8, 1-9, and/or 1-10, one and/or both of the MAC PDUs (e.g., the two MAC PDUs) associated with the TTI may merely comprise padding, padding BSR, and/or periodic BSR with zero MAC SDUs.

To solve one or more of the aforementioned issues (e.g., at least one of an issue that a MAC of a UE transmits merely one transport block to a PHY even though the MAC receives two UL grants with UL spatial multiplexing, where the PHY may expect two transport blocks, an issue that the PHY may be unable to generate a 4 layer transmission properly with merely one transport block, etc.), the UE may skip both UL transmissions for UL spatial multiplexing for a TTI. In an example, when the UE receives two UL grants for a TTI (and/or in response to receiving the two UL grants for the TTI), the UE may skip UL transmissions and/or may not generate any MAC PDUs for the TTI if the UE an amount of available data of the UE is less than a threshold amount of available data. Alternatively and/or additionally, when (and/or if) the UE is configured for UL spatial multiplexing, the UE may skip UL transmissions and/or may not generate any MAC PDUs for a TTI if an amount of available data of the UE is less than the threshold amount of available data. Alternatively and/or additionally, when (and/or if) UL grants associated with a TTI are for UL spatial multiplexing transmission, the UE may skip UL transmissions and/or may not generate any MAC PDUs for the TTI if an amount of available data of the UE is less than the threshold amount of available data. In some examples, the threshold amount of available data may correspond to an amount of available data accommodated by an UL grant of the two UL grants. For example, an amount of available data of the UE being less than the threshold amount of available data may indicate that the UE does not have enough available data for the TTI and/or the two UL grants (e.g., merely one UL grant of the two UL grants may accommodate all the available data).

In some examples, the UE may skip UL transmissions (e.g., two UL transmissions) for UL spatial multiplexing for a TTI when (and/or if) the UE receives two UL grants for the TTI and one of the two UL grants is able to accommodate available data of the UE (e.g., all available data of the UE), wherein the two UL grants correspond to the UL transmissions (e.g., the two UL transmissions) skipped by the UE. Alternatively and/or additionally, the UE may skip UL transmissions (e.g., two UL transmissions) for UL spatial multiplexing for a TTI. Alternatively and/or additionally, the UE may skip UL transmissions (e.g., two UL transmissions) for UL spatial multiplexing for a TTI when (and/or if) the UE receives two UL grants for the TTI and a MAC PDU associated with one of the two UL grants merely comprises padding, wherein the two UL grants correspond to the UL transmissions (e.g., the two UL transmissions) skipped by the UE. Alternatively and/or additionally, the UE may skip UL transmissions (e.g., two UL transmissions) for UL spatial multiplexing for a TTI when (and/or if) the UE receives two UL grants for the TTI and a MAC PDU for the TTI (and/or a MAC PDU associated with one of the two UL grants) merely comprises a MAC CE, for padding BSR or periodic BSR, with zero MAC SDUs. Alternatively and/or additionally, the UE may skip UL transmissions (e.g., two UL transmissions) for UL spatial multiplexing for a TTI when (and/or if) the UE receives two UL grants for the TTI, a first MAC PDU for the TTI (and/or a first MAC PDU associated with a first UL grant of the two UL grants) merely comprises a MAC CE, for padding BSR or periodic BSR, with zero MAC SDUs, and a second MAC PDU for the TTI (and/or a second MAC PDU associated with a second UL grant of the two UL grants) comprises data (e.g., available data of the UE) and/or a MAC SDU.

In some examples, when (and/or if) the UE receives two UL grants for a TTI and one of the two UL grants is able to accommodate available data of the UE (e.g., all available data of the UE), the UE may skip UL transmissions (e.g., two UL transmissions) and/or may not generate any MAC PDUs for the TTI, wherein the two UL grants correspond to the UL transmissions (e.g., the two UL transmissions) skipped by the UE. Alternatively and/or additionally, when (and/or if) the UE receives two UL grants for a TTI and a MAC PDU associated with one of the two UL grants merely comprises padding, the UE may skip UL transmissions (e.g., two UL transmissions) and/or may not generate any MAC PDUs for the TTI, wherein the two UL grants correspond to the UL transmissions (e.g., the two UL transmissions) skipped by the UE. Alternatively and/or additionally, when (and/or if) the UE receives two UL grants for a TTI and a MAC PDU for the TTI (and/or a MAC PDU associated with one of the two UL grants) merely comprises a MAC CE for padding BSR or periodic BSR with zero MAC SDUs, the UE may skip UL transmissions (e.g., two UL transmissions) and/or may not generate any MAC PDUs for the TTI, wherein the two UL grants correspond to the UL transmissions (e.g., the two UL transmissions) skipped by the UE. Alternatively and/or additionally, when (and/or if) the UE receives two UL grants for a TTI, a first MAC PDU for the TTI (and/or a first MAC PDU associated with a first UL grant of the two UL grants) merely comprises a MAC CE, for padding BSR or periodic BSR, with zero MAC SDUs, and a second MAC PDU for the TTI (and/or a second MAC PDU associated with a second UL grant of the two UL grants) comprises data (e.g., available data of the UE) and/or a MAC SDU, the UE may skip UL transmissions (e.g., two UL transmissions) and/or may not generate any MAC PDUs for the TTI, wherein the two UL grants correspond to the UL transmissions (e.g., the two UL transmissions) skipped by the UE.

In some examples, the Multiplexing and assembly entity may not generate any MAC PDU for a TTI when (and/or if) an amount of available data of the UE is less than the threshold amount of available data (e.g., the amount of available data of the UE being less than the threshold amount of data may indicate that the UE does not have enough available data for the TTI and/or two UL grants for the TTI). For example, a HARQ entity of the UE may discard a first MAC PDU if a second MAC PDU at the TTI is not obtained. Alternatively and/or additionally, the HARQ entity may not instruct a PHY of the UE to generate a transmission if a MAC PDU (e.g., any MAC PDU) of MAC PDUs (e.g., two MAC PDUs) associated with a TTI is not obtained.

The network may configure the UE with UL spatial multiplexing and a first parameter (e.g., skip UplinkTxDynamic). The UE may receive two UL grants at (and/or for) a TTI.

Example 2-1: Not Generate a MAC PDU when (and/or in Response to) Receiving Two UL Grants for a TTI In Example 2-1, when (and/or if) the UE has (and/or receives) two UL grants for a TTI (and/or in response to receiving the two UL grants), the UE may not generate any MAC PDU for the TTI if an amount of available data of the UE is less than the threshold amount of available data. During and/or in accordance with a LCP procedure (performed by the UE for performing an UL transmission, for example), the UE may not generate a MAC PDU if the UE does not have available data for UL grants (e.g., two UL grants) for a TTI (and/or an amount of available data of the UE is less than the threshold amount of available data), a MAC entity of the UE is configured with a first parameter (e.g., skip UplinkTxDynamic), and a grant (e.g., an UL grant received by the UE) is addressed to a C-RNTI.

Example 2-2: Discard a MAC PDU when (and/or in Response to) Receiving Two UL Grants at a TTI In Example 2-2, when (and/or if) the UE has (and/or receives) two UL grants for a TTI (and/or in response to receiving the two UL grants), the UE may discard a first MAC PDU associated with the TTI if a second MAC PDU associated with the TTI is not (and/or cannot be) obtained. Alternatively and/or additionally, if a first MAC PDU associated with a TTI has not been obtained, the UE may discard a second MAC PDU associated with the TTI. If the second MAC PDU associated with the TTI is not (and/or cannot be) obtained, the UE may discard the first MAC PDU. The UE may flush a related HARQ process buffer associated with the TTI and may not deliver the first MAC PDU associated with the TTI to a HARQ process (e.g., an identified HARQ process associated with and/or allocated to the TTI and/or an UL grant associated with the first MAC PDU).

Example 2-3: Not Instruct PHY to Generate a Transmission when (and/or in Response to) Receiving Two UL Grants for a TTI In Example 2-3, when (and/or if) the UE has (and/or receives) two UL grants for a TTI (and/or in response to receiving the two UL grants), the UE may not instruct a PHY of the UE to generate a transmission if a MAC PDU associated with a TTI is not obtained (and/or the UE may not instruct the PHY to generate a transmission if both MAC PDUs of two MAC PDUs associated with the TTI are not obtained). Alternatively and/or additionally, if the UE receives two UL grants for a TTI, a first MAC PDU associated with the TTI is not obtained and a second MAC PDU associated with the TTI is obtained, the UE may instruct the PHY to generate a transmission for the second MAC PDU. Alternatively and/or additionally, if the first MAC PDU and the second MAC PDU are not obtained, the UE may flush a related HARQ process buffer associated with the TTI.

The UE may be configured with UL spatial multiplexing and UL skipping. In some examples, the UE receives a DCI indicating UL transmission for two transport blocks. The DCI may be a DCI format associated with spatial multiplexing. The DCI may be DCI format 4. In some examples, the DCI enables two transport blocks. In some examples, the DCI indicates neither a first combination of $I_{MCS}=0$ and $N_{PRB}>1$, nor a second combination of $I_{MCS}=28$ and $N_{PRB}=1$, for two transport blocks (and/or for both transport blocks of the two transport blocks). For example, the DCI may not indicate the first combination nor the second combination for either transport block of the two transport blocks. In some examples, the UE (e.g., a MAC of the UE) generates a first PDU (e.g., one PDU) for a first transport block of the two transport blocks. In some examples, the UE (e.g., the MAC) does not generate a PDU for a second transport block of the two transport blocks. For example, the UE (e.g., the MAC) may not generate a PDU for the second transport block of the two transport blocks due to UL skipping. Alternatively and/or additionally, the UE (e.g., the MAC) may not generate a PDU for the second transport block of the two transport blocks due to one PDU (e.g., the first PDU for the first transport block) being sufficient to accommodate available data (e.g., all available data) of the UE. Alternatively and/or additionally, the UE (e.g., the MAC) may not generate a PDU for the second transport block of the two transport blocks due to a PDU for the second transport block comprising merely padding and/or due to there being merely padding left for inclusion in a PDU for the second transport block after generating the first PDU sufficient to accommodate available data (e.g., all available data) of the UE (and/or the UE may not generate the PDU for the second transport block if generation of the PDU would result in the PDU comprising merely padding). Alternatively and/or additionally, the UE (e.g., the MAC) may not generate a PDU for the second transport block of the two transport blocks due to a PDU for the second transport block comprising merely a MAC CE, for padding BSR or periodic BSR, with zero MAC SDUs (such as where the MAC CE and/or the PDU do not comprise any MAC SDU) and/or due to there being merely the MAC CE left for inclusion in a PDU for the second transport block after generating the first PDU sufficient to accommodate available data (e.g., all available data) of the UE (and/or the UE may not generate the PDU for the second transport block if generation of the PDU would result in the PDU comprising merely the MAC CE, for padding BSR or periodic BSR, with zero MAC SDUs).

In some examples, the UE (e.g., a PHY of the UE) does not perform UL transmission (e.g., PUSCH transmission) in response to the DCI. For example, the UE (e.g., the PHY) may not perform UL transmission (e.g., PUSCH transmission) in response to the DCI if one MAC PDU is generated (e.g., if a MAC PDU is generated for a first transport block of the two transport blocks and a MAC PDU is not generated for a second transport block of the two transport blocks). Alternatively and/or additionally, the UE (e.g., the PHY) may not perform UL transmission (e.g., PUSCH transmission) in response to the DCI if a MAC PDU for a first transport block of the two transport blocks or a MAC PDU for a second transport block of the two transport blocks is not generated. Alternatively and/or additionally, the UE (e.g., the PHY) may not perform UL transmission (e.g., PUSCH transmission) in response to the DCI if merely one MAC PDU is generated (e.g., if a MAC PDU is generated for a first transport block of the two transport blocks and a MAC PDU is not generated for a second transport block of the two transport blocks). In some examples, the UE (e.g., the PHY) performs UL transmission (e.g., PUSCH transmission) in response to the DCI if two MAC PDUs are generated for the two transport blocks (e.g., if a first MAC PDU is generated for a first transport block of the two transport blocks and a second MAC PDU is generated for a second transport block of the two transport blocks). For example, the UE (e.g., the PHY) may perform UL transmission (e.g., PUSCH transmission) in response to the DCI only if two MAC PDUs are generated for the two transport blocks (e.g., if a first MAC PDU is generated for a first transport block of the two transport blocks and a second MAC PDU is generated for a second transport block of the two transport blocks). Alternatively and/or additionally, the UE (e.g., the PHY) may not perform UL transmission (e.g., PUSCH transmission) in response to the DCI if no MAC PDU is generated and/or if merely one MAC PDU is generated (e.g., if a MAC PDU is generated for a first transport block of the two transport blocks and a MAC PDU is not generated for a second transport block of the two transport blocks).

In some examples, the UE (e.g., the PHY) disables a transport block for UL transmission (e.g., PUSCH transmission), such as the UL transmission performed in response to the DCI. In some examples, the UE (e.g., the PHY) disables a transport block for the UL transmission (e.g., PUSCH transmission) even if the DCI does not disable the transport block. In some examples, the UE (e.g., the PHY) disables a transport block for the UL transmission (e.g., PUSCH transmission) due to absence of one MAC PDU. In some examples, the UE (e.g., the PHY) disables a transport block for the UL transmission (e.g., PUSCH transmission) if one MAC PDU is generated (e.g., if a MAC PDU is generated for a first transport block of the two transport blocks and a MAC PDU is not generated for a second transport block of the two transport blocks). In some examples, the UE (e.g., the PHY) enables a transport block for the UL transmission (e.g., PUSCH transmission) if one MAC PDU is generated (e.g., if a MAC PDU is generated for a first transport block of the two transport blocks and a MAC PDU is not generated for a second transport block of the two transport blocks). In some examples, the UE (e.g., the PHY) disables a specific and/or predefined transport block for the UL transmission (e.g., PUSCH transmission) if one MAC PDU is generated (e.g., if a MAC PDU is generated for a first transport block of the two transport blocks and a MAC PDU is not generated for a second transport block of the two transport blocks). In some examples, the UE (e.g., the PHY) disables TB1 for the UL transmission (e.g., PUSCH transmission) if one MAC PDU is generated (e.g., if a MAC PDU is generated for a first transport block of the two transport blocks and a MAC PDU is not generated for a second transport block of the two transport blocks). In some examples, the UE (e.g., the PHY) disables TB2 for the UL transmission (e.g., PUSCH transmission) if one MAC PDU is generated (e.g., if a MAC PDU is generated for a first transport block of the two transport blocks and a MAC PDU is not generated for a second transport block of the two transport blocks). In some examples, the UE (e.g., the PHY) enables a transport block other than the transport block disabled by the UE (e.g., the PHY).

In some examples, the UE (e.g., the PHY) disables a specific and/or predefined codeword for the UL transmission (e.g., PUSCH transmission) if one MAC PDU is generated (e.g., if a MAC PDU is generated for a first transport block of the two transport blocks and a MAC PDU is not generated for a second transport block of the two transport blocks). For example, the UE (e.g., the PHY) may disable codeword 1 for the UL transmission (e.g., PUSCH transmission) if one MAC PDU is generated (e.g., if a MAC PDU is generated for a first transport block of the two transport blocks and a MAC PDU is not generated for a second transport block of the two transport blocks). Alternatively and/or additionally, the UE (e.g., the PHY) may disable codeword 0 for the UL transmission (e.g., PUSCH transmission) if one MAC PDU is generated (e.g., if a MAC PDU is generated for a first transport block of the two transport blocks and a MAC PDU is not generated for a second transport block of the two transport blocks). In some examples, the UE (e.g., the PHY) enables a codeword other than the codeword disabled by the UE (e.g., the PHY). In some examples, the UE uses an enabled transport block to carry a generated PDU (e.g., a MAC PDU generated for the enabled transport block).

Alternatively and/or additionally, the UE (e.g., the PHY) uses an enabled codeword to carry the generated PDU. In some examples, the UE (e.g., the PHY) uses layers, amounting to a first number of layers, to perform the UL transmission, wherein the first number of layers may be different from a second number of layers indicated by the DCI. In some examples, the UE (e.g., the PHY) may determine the first number of layers (for performing the UL transmission) and/or the second number of layers based on a field (e.g., "Precoding information and number of layers" field) of the DCI. Alternatively and/or additionally, the UE (e.g., the PHY) may determine the first number of layers (for performing the UL transmission) and/or the second number of layers based on a field (e.g., "Precoding information and number of layers" field) of the DCI and may assume that a transport block (one transport block) and/or a codeword (e.g., one codeword) is disabled. In some examples, the UE (e.g., the PHY) may determine the first number of layers (for performing the UL transmission) based on an assumption that merely one codeword is enabled (even if the DCI indicates that two codewords are enabled, for example). For example, the UE (e.g., the PHY) may determine the first number of layers (for performing the UL transmission) based on first information (e.g., a first column of a table) related to one codeword rather than second information (e.g., a second column of a table) related to two codewords (even if the DCI indicates that two codewords are enabled, for example). Alternatively and/or additionally, the UE (e.g., the PHY) may determine a precoder based on a field (e.g., "Precoding information and number of layers" field) of the DCI and may use the first information related to one codeword rather than the second information related to two codewords (even if the DCI indicates that two codewords are enabled). In some examples, the difference between the first number of layers (for performing the UL transmission) and the second number of layers (indicated by the DCI) is due to the UE disabling a transport block (e.g., one transport block) (rather than the transport block being disabled by DCI, for example). In some examples, the UE (e.g., PHY) uses a first precoder (for spatial multiplexing, for example) to perform the UL transmission, wherein the first precoder may be different from a second precoder (for spatial multiplexing, for example) indicated by the DCI. The UE (e.g., the PHY) may use the first precoder to perform the UL transmission based on a field (e.g., "Precoding information and number of layers" field) of the DCI. The UE (e.g., the PHY) may determine the first precoder (for spatial multiplexing, for example) based on a field (e.g., "Precoding information and number of layers" field) of the DCI and may assume that a transport block (one transport block) and/or a codeword (e.g., one codeword) is disabled. The UE (e.g., the PHY) may determine the first precoder based on a field (e.g., "Precoding information and number of layers" field) of the DCI and may use the first information related to one codeword rather than the second information related to two codewords (even if the DCI indicates that two codewords are enabled, for example). The UE (e.g., the PHY) may determine the first precoder using the first information related to one codeword rather than the second information related to two codewords (even if the DCI indicates that two codewords are enabled, for example). In some examples, the difference between the first precoder (for performing the UL transmission) and the second precoder (indicated by the DCI) is due to the UE disabling a transport block (e.g., one transport block) (rather than the transport block being disabled by DCI, for example). In some examples, the UE (e.g., the PHY) disables a transport block for the UL transmission (e.g., PUSCH transmission) if a MAC PDU (e.g., one MAC PDU of two MAC PDUs associated with a TTI) is not generated. In some examples, the UE (e.g., the PHY) disables a transport block for the UL transmission (e.g., PUSCH transmission) if only one MAC PDU is generated (e.g., if a MAC PDU is generated for a first transport block of the two transport blocks and a MAC PDU is not generated for a second transport block of the two transport blocks). In some examples, the UE (e.g., the PHY) does not disable a transport block for the UL transmission (e.g., PUSCH transmission) if two MAC PDUs are generated for the two transport blocks. In some examples, the UE (e.g., the PHY) enables the two Transport Blocks for the UL transmission (e.g., PUSCH transmission) if two MAC PDU are generated for the two transport blocks. The UL transmission (e.g., PUSCH transmission) may be a new transmission. Accordingly, a number of enabled codewords (e.g., one enabled codeword or two enabled codewords) and/or a number of enabled transport blocks (e.g., one enabled transport block or two enabled transport blocks) may be identical to a number of generated MAC PDUs (e.g., one generated MAC PDU or two generated MAC PDUs). The number of enabled codewords and/or the number of enabled transport blocks being identical to the number of generated MAC PDUs may enable the UE to perform a corresponding UL transmission (e.g., PUSCH transmission).

Table 1 shows numbers of layers, bit fields mapped to index and Transmitted Precoding Matrix Indicators (TPMIs) in an example scenario where spatial multiplexing and/or UL transmission is performed with four antenna ports.

TABLE 1

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| ... | ... | ... | ... |
| 23 | 1 layer: TPMI = 23 | 15 | 2 layers: TPMI1 = 15 |
| 24 | 2 layers: TPMI = 0 | 16 | 3 layers: TPMI = 0 |
| 25 | 2 layers: TPMI = 1 | 17 | 3 layers: TPMI = 1 |
| ... | ... | ... | ... |
| 39 | 2 layers: TPMI = 15 | 27 | 3 layers: TPMI = 11 |
| 40-63 | reserved | 28 | 4 layers: TPMI = 0 |
| | | 29-63 | Reserved |

In some systems, if the DCI indicates that two codewords are enabled, the UE determines the first number of layers and the first precoder (e.g., TPMI) based on and/or in accordance with a two codeword column, of Table 1, corresponding to two codewords (e.g., a top row of the two codeword column recites "Two codewords: Codeword 0 enabled Codeword 1 enabled"). For example, in those systems, the UE may determine the first number of layers and the first precoder based on a field (e.g., "Precoding information and number of layers" field) of the DCI. For example, in those systems, if the field (e.g., "Precoding information and number of layers" field) is equal to 1 and the DCI enables two codewords, the UE may perform UL transmission with 2 transport blocks, 2 layers, and TPMI=1. In an example, a value of the field (e.g., "Precoding information and number of layers" field) corresponds to values of "Bit field mapped to index" in Table 1. Using one or more of the techniques herein, the UE may determine the first number of layers and the first precoder (e.g., TPMI) based on and/or in accordance with a one codeword column, of Table 1, corresponding to one codeword (e.g., a top row of the one codeword column recites: "One codeword: Codeword 0 enabled Codeword 1 disabled). For example, the UE may determine the first number of layers and/or the first precoder based on and/or in accordance with the one codeword column based on the UE disabling a codeword and/or a transport block (e.g., the UE may determine the first number of layers and/or the first precoder based on and/or in accordance with the one codeword column even if the DCI enables two codewords). Accordingly, using one or more of the techniques herein, if the field (e.g., "Precoding information and number of layers" field) is equal to 1 (where the value of the field (e.g., "Precoding information and number of layers" field) corresponds to values of "Bit field mapped to index" in Table 1, for example), the UE may perform UL transmission with one transport block, one layer, and TPMI=1. Alternatively and/or additionally, the UE may use a specific entry (e.g., a predefined and/or pre-configured entry) of the one codeword column. In an example, the specific entry may correspond to a lowest entry (e.g., an entry corresponding to "Bit field mapped to index" equal to 0), or other entry (e.g., an entry corresponding to "Bit field mapped to index" equal to a first value, such as 0, 1, 2, 3, etc.). In an example in which the specific entry of the one codeword column corresponds to "Bit field mapped to index" equal to 0, the UE may perform UL transmission with one transport block, one layer and TPMI=0 (even if the field (e.g., "Precoding information and number of layers" field) is not equal to 0).

In some examples, the UE (e.g., the PHY) performs UL transmission for one MAC PDU (e.g., one generated MAC PDU). For example, the UE (e.g., the PHY) performs UL transmission for one MAC PDU if one MAC PDU is generated (e.g., if a MAC PDU is generated for a first transport block of the two transport blocks and a MAC PDU is not generated for a second transport block of the two transport blocks). For example, if a first MAC PDU of two MAC PDUs for a TTI is generated, and a second MAC PDU of the two MAC PDUs for the TTI is not generated, the UE (e.g., the PHY) may perform UL transmission for the first MAC PDU. In some examples, the UE (e.g., the PHY) does not perform UL transmission for the second MAC PDU not generated by the UE (e.g., generated by the MAC of the UE). Alternatively and/or additionally, the UE (e.g., the PHY) may perform UL transmission with a first codeword (e.g., one codeword) and/or a first transport block (e.g., one transport block). In some examples, the first codeword is codeword 0. Alternatively and/or additionally, the first codeword may be codeword 1. In some examples, the UE (e.g., the PHY) uses layers, amounting to a first number of layers, to perform the UL transmission, wherein the first number of layers may be different from a second number of layers indicated by the DCI. In some examples, the UE (e.g., the PHY) may determine the first number of layers (for performing the UL transmission) and/or the second number of layers based on a field (e.g., "Precoding information and number of layers" field) of the DCI. Alternatively and/or additionally, the UE (e.g., the PHY) may determine the first number of layers (for performing the UL transmission) and/or the second number of layers based on a field (e.g., "Precoding information and number of layers" field) of the DCI and may assume that a transport block (one transport block) and/or a codeword (e.g., one codeword) is disabled.

In some examples, the UE (e.g., the PHY) may determine the first number of layers (for performing the UL transmission) based on an assumption that merely one codeword is enabled (even if the DCI indicates that two codewords are enabled, for example). For example, the UE (e.g., the PHY) may determine the first number of layers (for performing the UL transmission) based on first information (e.g., a first column of a table) related to one codeword rather than second information (e.g., a second column of a table) related to two codewords (even if the DCI indicates that two codewords are enabled, for example). Alternatively and/or additionally, the UE (e.g., the PHY) may determine a precoder based on a field (e.g., "Precoding information and number of layers" field) of the DCI and may use the first information related to one codeword rather than the second information related to two codewords (even if the DCI indicates that two codewords are enabled). In some examples, the difference between the first number of layers (for performing the UL transmission) and the second number of layers (indicated by the DCI) is due to the UE disabling a transport block (e.g., one transport block) (rather than the transport block being disabled by DCI, for example). In some examples, the UE (e.g., PHY) uses a first precoder (for spatial multiplexing, for example) to perform the UL transmission, wherein the first precoder may be different from a second precoder (for spatial multiplexing, for example) indicated by the DCI. The UE (e.g., the PHY) may use the first precoder to perform the UL transmission based on a field (e.g., "Precoding information and number of layers" field) of the DCI. The UE (e.g., the PHY) may determine the first precoder (for spatial multiplexing, for example) based on a field (e.g., "Precoding information and number of layers" field) of the DCI and may assume that a transport block (one transport block) and/or a codeword (e.g., one codeword) is disabled. The UE (e.g., the PHY) may determine the first precoder based on a field (e.g., "Precoding information and number of layers" field) of the DCI and may use the first information related to one codeword rather than the second information related to two codewords (even if the DCI indicates that two codewords are enabled, for example). The UE (e.g., the PHY) may determine the first precoder using the first information related to one codeword rather than the second information related to two codewords (even if the DCI indicates that two codewords are enabled, for example). In some examples, the difference between the first precoder (for performing the UL transmission) and the second precoder (indicated by the DCI) is due to the UE disabling a transport block (e.g., one transport block) (rather than the transport block being disabled by DCI, for example).

In some examples, the UE (e.g., the PHY) performs UL transmission for two MAC PDUs if two MAC PDUs are generated (for a TTI, for example). The UE (e.g., the PHY) may perform the UL transmission with two codewords. Alternatively and/or additionally, the UE (e.g., the PHY) may use layers (amounting to a number of layers) and/or a precoder to perform the UL transmission, wherein the number of layers and the precoder are determined based on a DCI (and/or the DCI is indicative of the number of layers and the precoder). For example, if the two MAC PDUs are generated, the UE (e.g., the PHY) may use a number of layers and/or a precoder, as indicated by the DCI for two codewords, to perform the UL transmission (e.g., the number of layers and/or the precoder (e.g., TPMI) may be determined based on and/or in accordance with information of the two codeword column of Table 1 if the two MAC PDUs are generated for the TTI). Alternatively and/or additionally, if the two MAC PDUs are generated (for the TTI, for example) and the DCI indicates that two codewords are enabled, the UE may determine the number of layers and/or the precoder based on the indication of the DCI that two codewords are enabled (rather than the UE determining the number of layers and/or the precoder based on an assumption that merely one codeword is enabled, for example).

The network may need to attempt (and/or the network may be configured to perform) multiple decoding techniques and/or multiple decoding hypotheses (e.g., different decoding techniques and/or different decoding hypotheses) to decode an UL transmission by the UE because the network may not know a number of transport blocks used for the UL transmission, a number of layers used for the UL transmission and/or a precoder used for the UL transmission. The network may not know the number of transport blocks, the number of layers and/or the precoder because the network may not know whether the UE generates one MAC PDU for the UL transmission or two MAC PDUs for the UL transmission (which may be related to buffer status of the UE, for example). The network may need to (and/or the network may be configured to) blind decode the multiple decoding hypotheses and/or the multiple decoding techniques. For example, the network may decode the UL transmission with a hypothesis that two MAC PDUs are generated for the UL transmission and/or the network may decode the UL transmission with a hypothesis that one MAC PDU is generated for the UL transmission.

In some examples, the UE (e.g., the PHY) performs UL transmission for one MAC PDU. For example, the UE (e.g., the PHY) may perform UL transmission for one MAC PDU if one MAC PDU is generated (by the UE, such as by a MAC of the UE, for example). The UE (e.g., the PHY) may not perform UL transmission for a second MAC PDU not generated by the UE (e.g., the MAC). The UE (e.g., the PHY) may perform UL transmission with two codewords (and/or two transport blocks). A first codeword of the two codewords (and/or a first transport block of the two transport blocks) may be used to carry a MAC PDU (e.g., a generated MAC PDU). A second codeword of the two codewords (and/or a second transport block of the two transport blocks) may be used to carry a set of bits. The set of bits may be randomly generated. The set of bits may have specific values and/or predefined values (e.g., the set of bits may comprise at least one of all 0's, all 1's, 0101, etc.). The set of bits may be padding bits or dummy bits. The set of bits may be generated by PHY of the UE. The set of bits may not be received from the MAC. In some examples, the first codeword of the two codewords (and/or the first transport block of the two transport blocks) may comprise data from UE. The second codeword of the two codewords (and/or the second transport block of the two transport blocks) may not comprise data from UE. The second codeword of the two codewords (and/or the second transport block of the two transport blocks) may be a special codeword (and/or a special transport block). Alternatively and/or additionally, the second codeword of the two codewords (and/or the second transport block of the two transport blocks) may be a predefined codeword (and/or a predefined transport block). Alternatively and/or additionally, the second codeword of the two codewords (and/or the second transport block of the two transport blocks) may be a dummy codeword (and/or a dummy transport block). Alternatively and/or additionally, the second codeword of the two codewords (and/or the second transport block of the two transport blocks) may be filled with pre-generated, pre-known and/or random information.

In some examples, the UE may be configured for UL spatial multiplexing by the network. The UE may receive UL grants (e.g., two UL grants) dynamically on a PDCCH. In some examples, the UL grants are for spatial multiplexing transmission. One or more actions, techniques and/or operations provided herein performed by the UE may be performed by the UE, a MAC of the UE, a PHY of the UE, a HARQ entity of the UE, a Multiplexing and assembly entity of the UE, or a HARQ process of the UE (e.g., the UE may refer to at least one of the UE, the MAC, the PHY, the HARQ entity, the Multiplexing and assembly entity, the HARQ process, etc.).

The UE may be a LTE device. Alternatively and/or additionally, the UE may be a NR device.

The network may be a base station. Alternatively and/or additionally, the network may be an access point. Alternatively and/or additionally, the network may be an eNB. Alternatively and/or additionally, the network may be a gNB. Network, network node, base station, access point, eNB, and/or gNB may be used interchangeably throughout the present disclosure.

One, some and/or all of the foregoing techniques and/or embodiments can be formed to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 6:
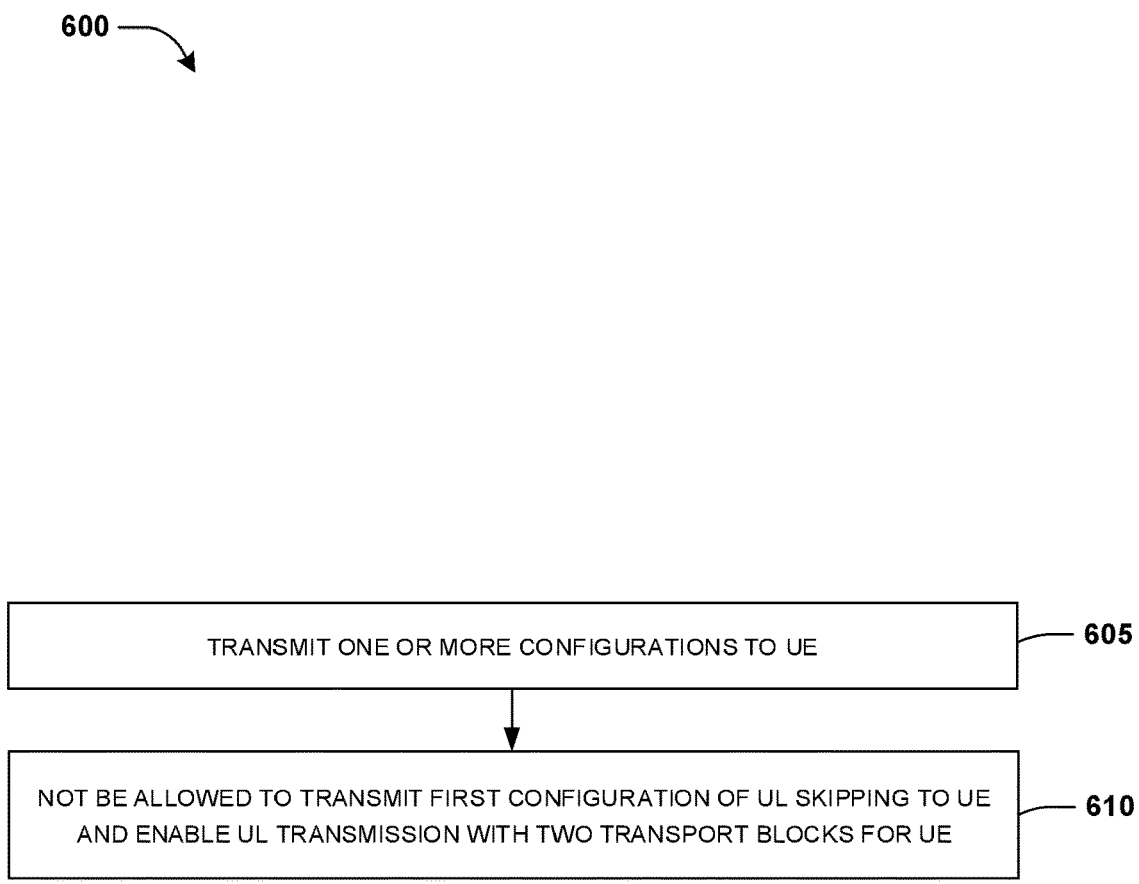
FIG. 6 is a flow chart according to one exemplary embodiment.

FIG. 6 is a flow chart 600 according to one exemplary embodiment from the perspective of a network. In step 605, the network transmits one or more configurations to a UE. In step 610, the network is not allowed to transmit a first configuration of UL skipping to the UE and enable UL transmission with two transport blocks for the UE.

In one embodiment, enabling UL transmission with two transport blocks corresponds to transmitting, to the UE, a second configuration of UL spatial multiplexing.

In one embodiment, the network schedules UL transmission for a TTI to the UE.

In one embodiment, the UE is configured with the first configuration or the second configuration (e.g., the UE is not concurrently and/or simultaneously configured with both the first configuration and the second configuration).

In one embodiment, enabling UL transmission with two transport blocks corresponds to indicating to and/or instructing, in a DCI, the UE to perform UL transmission with two transport blocks.

In one embodiment, when (and/or if and/or based on a determination that) the UE is configured with both of the first configuration and the second configuration, the network indicates to and/or instructs the UE to perform UL transmission with one transport block.

In one embodiment, the network indicates to and/or instructs the UE to perform UL transmission with one transport block by indicating, in a DCI (transmitted to the UE, for example), that a second transport block (other than the one transport block) is disabled.

In one embodiment, the network indicates to and/or instructs the UE to perform UL transmission with one transport block by scheduling the UE with a DCI format associated with a single antenna port.

In one embodiment, enabling UL transmission with two transport blocks corresponds to enabling UL spatial multiplexing (for the UE).

In one embodiment, when (and/or if and/or based on a determination that) the UE is configured with both of the first configuration and the second configuration, the network indicates to and/or instructs the UE to disable UL spatial multiplexing or the network indicates to and/or instructs the UE not to enable UL spatial multiplexing.

In one embodiment, the network indicates to and/or instructs the UE to disable UL spatial multiplexing by scheduling the UE with a DCI format associated with a single antenna port.

In one embodiment, the network indicates to and/or instructs the UE not to enable UL spatial multiplexing by scheduling the UE with a DCI format associated with a single antenna port.

Referring back to FIGS. 3 and 4, in one exemplary embodiment of a network, the device 300 includes a program code 312 stored in the memory 310. The CPU 308 may execute program code 312 to enable the network (i) to transmit one or more configurations to a UE, and (ii) to not be allowed to transmit a first configuration of UL skipping to the UE and enable UL transmission with two transport blocks for the UE. Furthermore, the CPU 308 can execute the program code 312 to perform one, some and/or all of the above-described actions and steps and/or others described herein.

Figure 7:
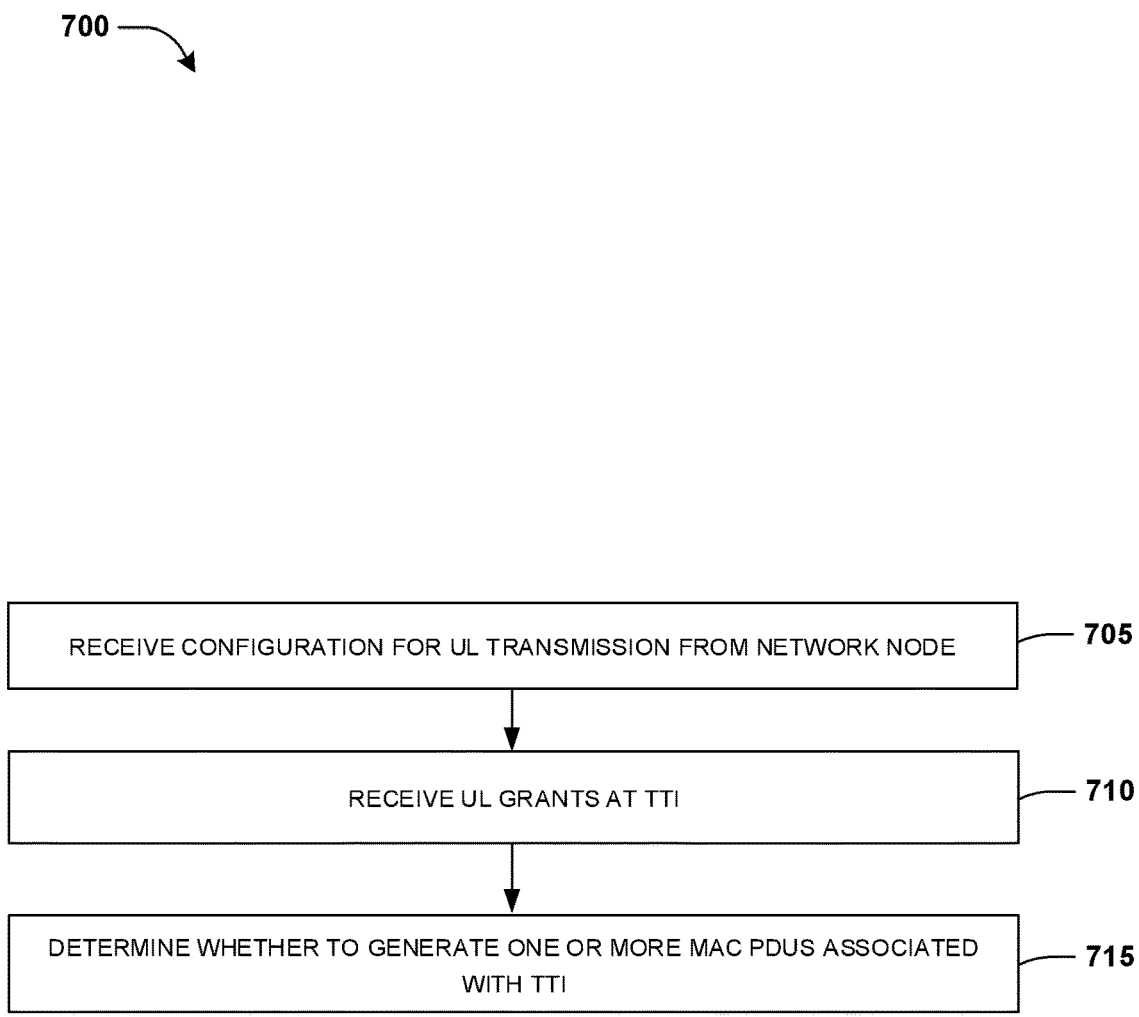
FIG. 7 is a flow chart according to one exemplary embodiment.

FIG. 7 is a flow chart 700 according to one exemplary embodiment from the perspective of a UE. In step 705, the UE receives a configuration for UL transmission from a network node. In step 710, the UE receives UL grants at a TTI. In step 715, the UE determines whether to generate one or more MAC PDUs associated with the TTI.

In one embodiment, the configuration comprises an UL spatial multiplexing configuration and an UL transmission skipping configuration.

In one embodiment, the UE does not skip an UL transmission for UL spatial multiplexing (e.g., an UL transmission performed using UL spatial multiplexing).

In one embodiment, the UE does not skip an UL transmission for UL spatial multiplexing (e.g., an UL transmission performed using UL spatial multiplexing) when (and/or if and/or based on a determination that) a MAC PDU associated with the UL transmission does not comprise available data of the UE.

In one embodiment, the UE skips an UL transmission for UL spatial multiplexing (e.g., an UL transmission performed using UL spatial multiplexing) when (and/or if and/or based on a determination that) the UE does not have available data (associated with the TTI, for example).

In one embodiment, the UE does not skip an UL transmission for UL spatial multiplexing (e.g., an UL transmission performed using UL spatial multiplexing) when (and/or if and/or based on a determination that) the UE has less than a threshold amount of available data (for the TTI and/or the UL transmission, for example). In some examples, the threshold amount of available data may correspond to an amount of available data accommodated by an UL grant of the UL grants (e.g., two UL grants). For example, the UE having less than the threshold amount of available data may indicate that the UE does not have enough available data for the TTI and/or the two UL grants (e.g., merely one UL grant of the two UL grants may accommodate all the available data).

In one embodiment, the UE does not skip an UL transmission for UL spatial multiplexing (e.g., an UL transmission performed using UL spatial multiplexing) when (and/or if and/or based on a determination that) the UE does not have enough available data, such as when the UE has less than the threshold amount of available data.

In one embodiment, the UE generates a padding MAC PDU (associated with the TTI, for example) when (and/or if and/or based on a determination that) the UE does not have enough available data, such as when the UE has less than the threshold amount of available data.

In one embodiment, the UE generates two MAC PDUs (associated with the TTI, for example) when (and/or if and/or based on a determination that) the UE does not have enough available data, such as when the UE has less than the threshold amount of available data.

In one embodiment, the UE generates two MAC PDUs (associated with the TTI, for example), wherein one of the two MAC PDUs does not comprise available data.

In one embodiment, the UE does not generate any MAC PDU (associated with the TTI, for example) when (and/or if and/or based on a determination that) both of the two MAC PDUs does not comprise available data. For example, the UE may not generate any MAC PDU (associated with the TTI, for example) when (and/or if and/or based on a determination that) the UE does not have available data to be included in a MAC PDU (e.g., any MAC PDU) for the TTI. Alternatively and/or additionally, the UE may not generate any MAC PDU (associated with the TTI, for example) when (and/or if and/or based on a determination that) generation of the two MAC PDUs would result in the two MAC PDUs not comprising available data of the UE.

In one embodiment, the UE separates (and/or splits) available data of the UE to the two MAC PDUs associated with the TTI.

In one embodiment, the UE separates (and/or splits) the available data to the two MAC PDUs associated with the TTI to avoid one of the MAC PDUs not comprising any available data of the UE (and/or to ensure that both MAC PDUs of the two MAC PDUs comprise available data of the UE).

In one embodiment, the UE ignores one or more UL skipping conditions associated with the UL skipping and/or the first configuration.

In one embodiment, the UE obtains a MAC PDU (associated with the TTI, for example) from a second HARQ process buffer. In some examples, the second HARQ process buffer may be associated with a second HARQ process other than a related HARQ process that is associated with and/or allocated to the TTI and/or a first UL grant for which the MAC PDU is generated, where the second HARQ process may be associated with and/or allocated to the TTI and/or a second UL grant for the TTI.

In one embodiment, the UE performs the UL transmission with two transport blocks, wherein a first transport block (e.g., one transport block) of the two transport blocks comprises a MAC PDU and a second transport block (e.g., one other transport block other than the first transport block) of the two transport blocks does not comprise a MAC PDU.

In one embodiment, the second transport block is a special transport block, a predefined transport block, a dummy transport block, a transport block with known information, and/or a transport block with random information.

In one embodiment, the UE performs the UL transmission with a single transport block when (and/or if and/or based on a determination that) the UE has less than the threshold amount of available data (for the TTI and/or the UL transmission, for example).

In one embodiment, the UE performs the UL transmission with a single transport block when (and/or if and/or based on a determination that) the UE does not have enough available data, such as when the UE has less than the threshold amount of available data.

In one embodiment, the single transport block comprises a generated MAC PDU (e.g., a MAC PDU generated by the UE) for the UL transmission.

In one embodiment, the UE does not generate two MAC PDUs for the UL transmission.

In one embodiment, the UE performs the UL transmission with a single transport block when (and/or if and/or based on a determination that) the UE does not generate two MAC PDUs for the UL transmission.

In one embodiment, the UE skips UL transmission for UL spatial multiplexing when (and/or if and/or based on a determination that) the UE does not have enough available data, such as when the UE has less than the threshold amount of available data.

In one embodiment, the UE does not generate any MAC PDUs (associated with the TTI, for example).

In one embodiment, the UE discards a first MAC PDU (e.g., one MAC PDU) when (and/or if and/or based on a determination that) a second MAC PDU (e.g., another MAC PDU, other than the first MAC PDU, of two MAC PDUs, for example) associated with the TTI is not obtained.

In one embodiment, the UE does not instruct and/or does not perform the UL transmission when (and/or if and/or based on a determination that) a MAC PDU associated with the TTI is not obtained (e.g., any MAC PDU of MAC PDUs, such as two MAC PDUs, associated with the TTI is not obtained).

In one embodiment, the UE does not perform the UL transmission associated with the TTI when (and/or if and/or based on a determination that) any of the MAC PDUs (e.g., two MAC PDUs associated with the TTI) is not obtained.

In one embodiment, the UE instructs and/or performs the UL transmission when (and/or if and/or based on a determination that) two MAC PDUs associated with the TTI are obtained.

In one embodiment, the UE performs the UL transmission associated with the TTI when (and/or if and/or based on a determination that) two MAC PDUs (associated with the TTI, for example) are obtained.

In one embodiment, the TTI is a given TTI.

In one embodiment, a DCI scheduling the UL transmission indicates to and/or instructs the UE to perform the UL transmission with two transport blocks.

Referring back to FIGS. 3 and 4, in one exemplary embodiment of a UE, the device 300 includes a program code 312 stored in the memory 310. The CPU 308 may execute program code 312 to enable the UE (i) to receive a configuration for UL transmission from a network node, (ii) to receive UL grants at a TTI, and (iii) to determine whether to generate one or more MAC PDUs associated with the TTI. Furthermore, the CPU 308 can execute the program code 312 to perform one, some and/or all of the above-described actions and steps and/or others described herein.

With respect to FIGS. 6-7, in one embodiment, aperiodic CSI is not requested for the TTI. For example, there is no aperiodic CSI requested for the TTI. Alternatively and/or additionally, the UE may not be requested to provide aperiodic CSI (e.g., an aperiodic CSI report) to the network via the TTI. Alternatively and/or additionally, the network may not request the UE to provide aperiodic CSI (e.g., an aperiodic CSI report) to the network via the TTI.

In one embodiment, the TTI is and/or comprises a subframe, a slot, a subslot, a sTTI, 2 symbols, 3 symbols, and/or 7 symbols (and/or a different number of symbols).

In one embodiment, the UL transmission is a PUSCH transmission.

In one embodiment, the UE is a LTE device, a NR device and/or a NR-light device.

In one embodiment, the network is a base station, an access point, an eNB, and/or a gNB.

Figure 8:
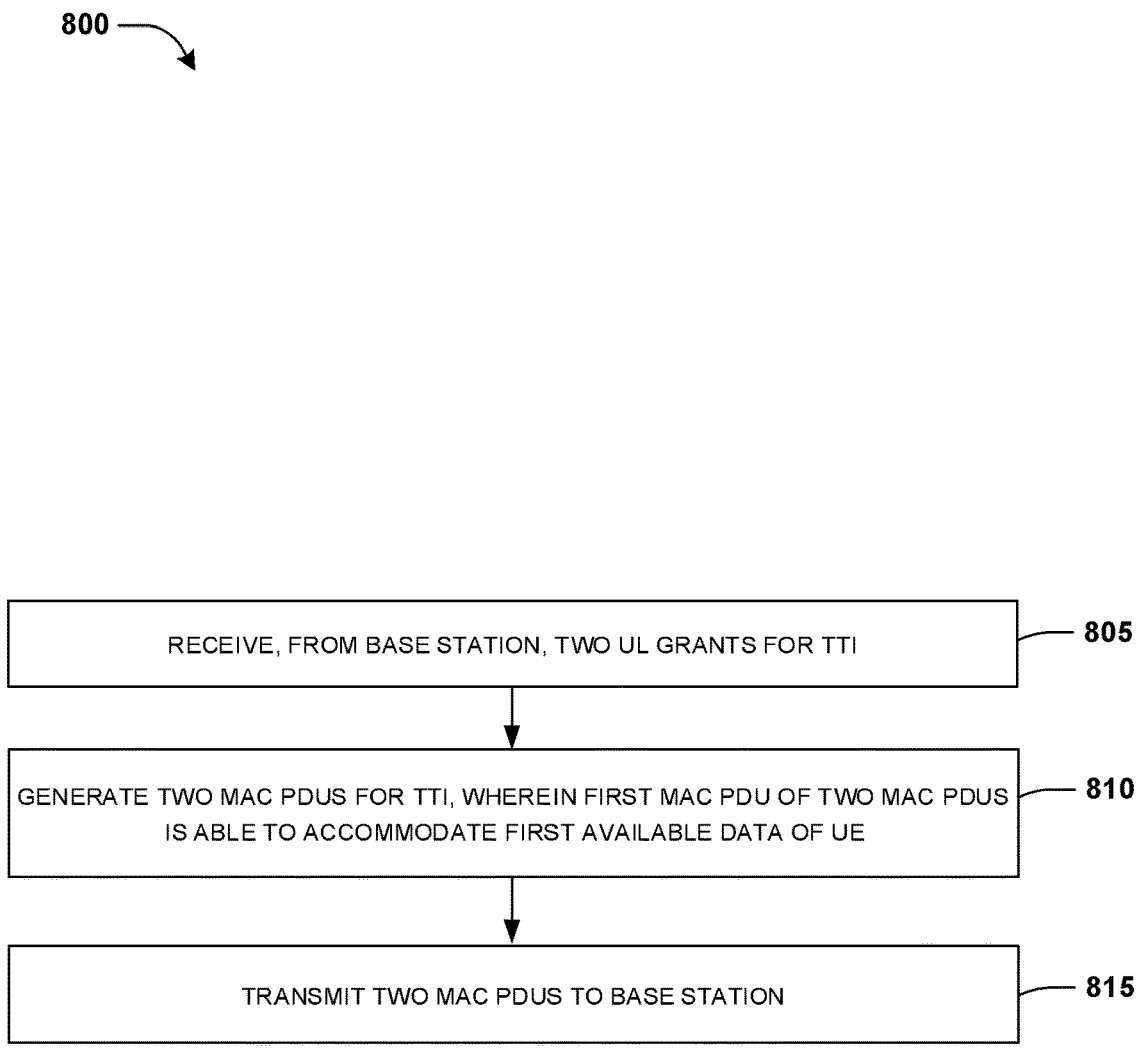
FIG. 8 is a flow chart according to one exemplary embodiment.

FIG. 8 is a flow chart 800 according to one exemplary embodiment from the perspective of a UE configured with UL spatial multiplexing and UL skipping. In step 805, the UE receives, from a base station, two UL grants for a TTI. In step 810, the UE generates two MAC PDUs for the TTI, wherein a first MAC PDU (e.g., one MAC PDU) of the two MAC PDUs is able to accommodate first available data (e.g., all available data) of the UE. In step 815, the UE transmits the two MAC PDUs to the base station.

In one embodiment, the first available data may correspond to UE data and/or UL data of the UE. For example, the first available data of the UE may correspond to UE data of the UE that is available for UL transmission (e.g., PUSCH transmission). Alternatively and/or additionally, the first available data of the UE may correspond to UE data of the UE that is available for UL transmission (e.g., PUSCH transmission) using the two UL grants and/or the TTI. Alternatively and/or additionally, the first available data of the UE may correspond to UE data of the UE that is available for one or more logical channels (e.g., all logical channels) of the UE. In some examples, the first available data may comprise all available data of the UE. All available data of the UE may correspond to all UE data of the UE that is available for UL transmission (e.g., PUSCH transmission). Alternatively and/or additionally, all available data of the UE may correspond to all UE data of the UE that is available for UL transmission (e.g., PUSCH transmission) using the two UL grants and/or the TTI. Alternatively and/or additionally, all available data of the UE may correspond to all UE data of the UE that is available for one or more logical channels (e.g., all logical channels) of the UE.

In one embodiment, the first MAC PDU is able to accommodate the first available data (e.g., all available data of the UE) if the first available data (e.g., all available data of the UE) can be included in the first MAC PDU. Alternatively and/or additionally, the first MAC PDU is able to accommodate the first available data (e.g., all available data of the UE) if a size of the first MAC PDU exceeds a size of the first available data (e.g., a size of all available data of the UE). Alternatively and/or additionally, the first MAC PDU is able to accommodate the first available data (e.g., all available data of the UE) if an amount of available data that can be included in the first MAC PDU is the same as or larger than an amount of data of the first available data (e.g., an amount of data of all available data of the UE). Alternatively and/or additionally, the first MAC PDU is able to accommodate the first available data (e.g., all available data of the UE) if a capacity of the first MAC PDU is the same as or larger than an amount of data of the first available data (e.g., an amount of data of all available data of the UE).

In one embodiment, the UE configured with UL spatial multiplexing receives up to two UL grants for one TTI. For example, the UE receives up to two UL grants for a second TTI (and/or the UE receives the two UL grants for the TTI) based on and/or due to the UE being configured with UL spatial multiplexing.

In one embodiment, when the UE is configured with UL spatial multiplexing, the UE receives up to two UL grants for one TTI. For example, when the UE is configured with UL spatial multiplexing, the UE may receive up to two UL grants for one TTI based on and/or due to the UE being configured with UL spatial multiplexing.

In one embodiment, the UE does not receive an UL grant, other than the two UL grants, for the TTI. For example, the UE may merely receive the two UL grants for the TTI (and/or the UE may not receive more UL grants, than the two UL grants, for the TTI).

In one embodiment, the UE configured with UL skipping does not generate a MAC PDU for a dynamic UL grant when (and/or if and/or based on a determination that) no data is available for a MAC PDU transmission (e.g., the UE has no available data for the MAC PDU transmission). For example, the UE may not generate the MAC PDU for the dynamic UL grant when no data is available for the MAC PDU transmission based on and/or due to the UE being configured with UL skipping.

In one embodiment, when the UE is configured with UL skipping, the UE does not generate a MAC PDU for a dynamic UL grant if no data is available for MAC PDU transmission associated with the dynamic UL grant. For example, if the UE receives a dynamic UL grant and if the UE has no data available for MAC PDU transmission associated with the dynamic UL grant, the UE may not generate a MAC PDU for the dynamic UL grant based on and/or due to the UE being configured with UL skipping.

In one embodiment, the UE receives a dynamic UL grant (other than the two UL grants, for example). The UE does not generate a MAC PDU for the dynamic UL grant when (and/or if and/or based on a determination that) the UE has no available data for a MAC PDU transmission associated with the dynamic UL grant.

In one embodiment, the two UL grants are two dynamic UL grants for a HARQ entity.

In one embodiment, aperiodic CSI is not requested for the TTI. For example, there is no aperiodic CSI requested for the TTI. Alternatively and/or additionally, the UE may not be requested to provide aperiodic CSI (e.g., an aperiodic CSI report) to the base station via the TTI. Alternatively and/or additionally, the base station may not request the UE to provide aperiodic CSI (e.g., an aperiodic CSI report) to the base station via the TTI.

In one embodiment, one MAC PDU of the two MAC PDUs merely comprises a MAC CE, for a padding BSR or for a periodic BSR, with zero MAC SDUs (e.g., the MAC PDU and/or the MAC CE do not comprise any MAC SDUs). For example, the one MAC PDU may not comprise the first available data (and/or the one MAC PDU may not comprise any of the first available data).

In one embodiment, the UE receives, from the base station (or a different base station), a second set of two UL grants for a second TTI. The UE does not generate any MAC PDU for the second TTI when (and/or if and/or based on a determination that) the UE does not have available data to be included in a MAC PDU for the second TTI (e.g., the UE does not have available data to be included in a second set of two MAC PDUs for the second TTI), and/or the UE merely has a MAC CE, for a padding BSR or for a periodic BSR, with zero MAC SDUs, for inclusion in MAC PDUs for the second TTI (e.g., the UE merely has a MAC CE, for a padding BSR or for a periodic BSR, with zero MAC SDUs, for inclusion in the second set of two MAC PDUs for the second TTI).

In one embodiment, the UE receives, from the base station (or a different base station), a second set of two UL grants for a second TTI. The UE does not generate any MAC PDU for the second TTI when (and/or if and/or based on a determination that) both MAC PDUs of a second set of two MAC PDUs for the second TTI do not comprise available data of the UE and/or when (and/or if and/or based on a determination that) the second set of two MAC PDUs for the second TTI merely comprise a MAC CE, for a padding BSR or for a periodic BSR, with zero MAC SDUs.

In one embodiment, the UE receives, from the base station (or a different base station), a second set of two UL grants for a second TTI. The UE does not generate any MAC PDU for the second TTI when (and/or if and/or based on a determination that) generation of a second set of two MAC PDUs for the second TTI would result in the second set of two MAC PDUs not comprising available data of the UE and/or when (and/or if and/or based on a determination that) generation of the second set of two MAC PDUs for the second TTI would result in the second set of two MAC PDUs merely comprising a MAC CE, for a padding BSR or for a periodic BSR, with zero MAC SDUs.

Referring back to FIGS. 3 and 4, in one exemplary embodiment of a UE configured with UL spatial multiplexing and UL skipping, the device 300 includes a program code 312 stored in the memory 310. The CPU 308 may execute program code 312 to enable the UE (i) to receive, from a base station, two UL grants for a TTI, (ii) to generate two MAC PDUs for the TTI, wherein a first MAC PDU (e.g., one MAC PDU) of the two MAC PDUs is able to accommodate first available data (e.g., all available data) of the UE, and (iii) to transmit the two MAC PDUs to the base station. Furthermore, the CPU 308 can execute the program code 312 to perform one, some and/or all of the above-described actions and steps and/or others described herein.

Figure 9:
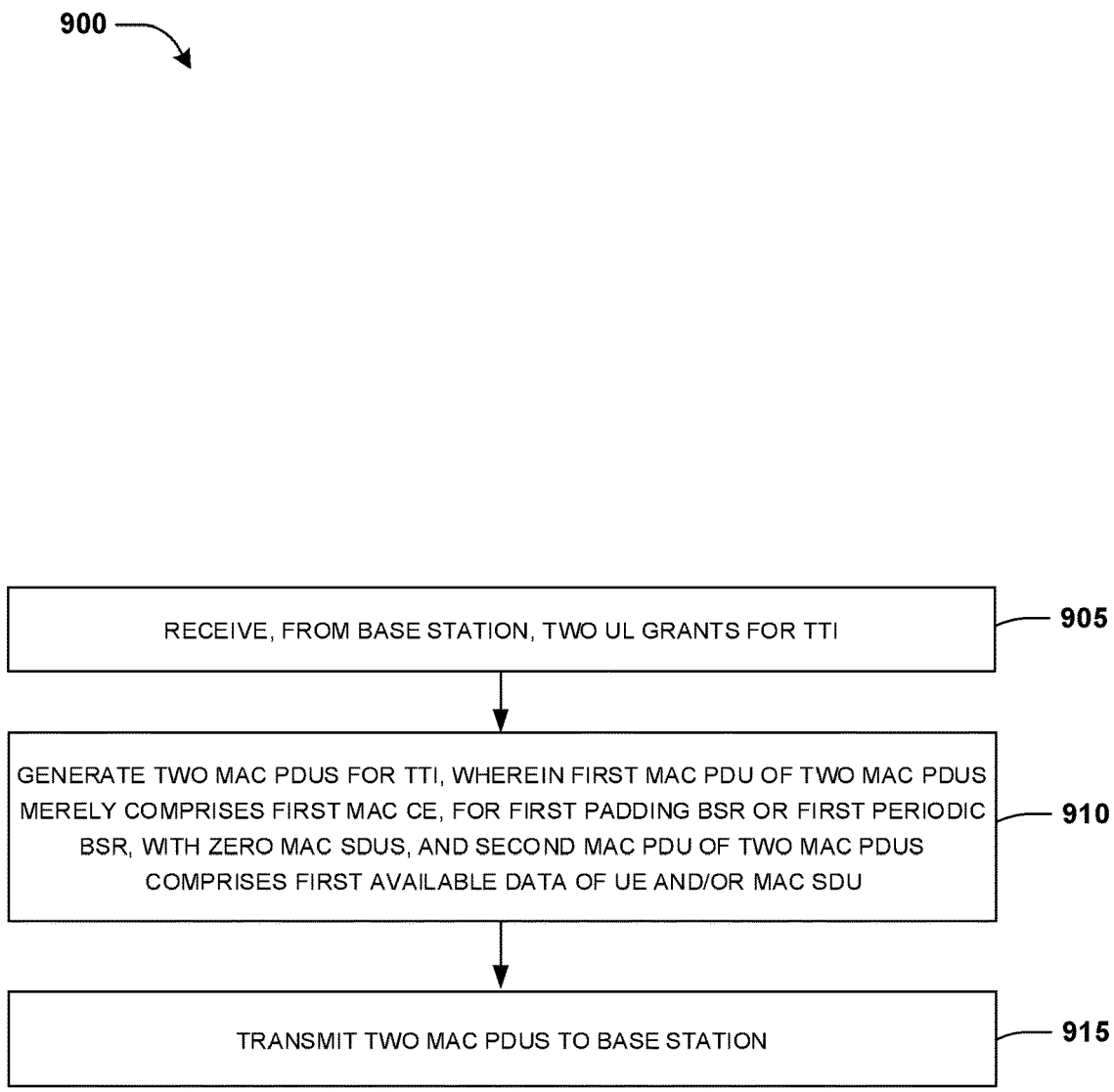
FIG. 9 is a flow chart according to one exemplary embodiment.

FIG. 9 is a flow chart 900 according to one exemplary embodiment from the perspective of a UE configured with UL spatial multiplexing and UL skipping. In step 905, the UE receives, from a base station, two UL grants for a TTI. In step 910, the UE generates two MAC PDUs for the TTI, wherein a first MAC PDU (e.g., one MAC PDU) of the two MAC PDUs merely comprises a first MAC CE, for a first padding BSR or a first periodic BSR, with zero MAC SDUs (e.g., the first MAC PDU and/or the first MAC CE do not comprise any MAC SDUs) and a second MAC PDU (e.g., one MAC PDU other than the first MAC PDU) of the two MAC PDUs comprises first available data of the UE and/or a MAC SDU. In step 915, the UE transmits the two MAC PDUs to the base station.

In one embodiment, the first available data may correspond to UE data and/or UL data of the UE. For example, the first available data of the UE may correspond to UE data of the UE that is available for UL transmission (e.g., PUSCH transmission). Alternatively and/or additionally, the first available data of the UE may correspond to UE data of the UE that is available for UL transmission (e.g., PUSCH transmission) using the two UL grants and/or the TTI. Alternatively and/or additionally, the first available data of the UE may correspond to UE data of the UE that is available for one or more logical channels (e.g., all logical channels) of the UE.

In one embodiment, the UE configured with UL spatial multiplexing receives up to two UL grants for one TTI. For example, the UE receives up to two UL grants for a second TTI (and/or the UE receives the two UL grants for the TTI) based on and/or due to the UE being configured with UL spatial multiplexing.

In one embodiment, when the UE is configured with UL spatial multiplexing, the UE receives up to two UL grants for one TTI. For example, when the UE is configured with UL spatial multiplexing, the UE may receive up to two UL grants for one TTI based on and/or due to the UE being configured with UL spatial multiplexing.

In one embodiment, the UE does not receive an UL grant, other than the two UL grants, for the TTI. For example, the UE may merely receive the two UL grants for the TTI (and/or the UE may not receive more UL grants than the two UL grants for the TTI).

In one embodiment, the UE configured with UL skipping does not generate a MAC PDU for a dynamic UL grant when (and/or if and/or based on a determination that) no data is available for a MAC PDU transmission (e.g., the UE has no available data for the MAC PDU transmission). For example, the UE may not generate the MAC PDU for the dynamic UL grant when no data is available for the MAC PDU transmission based on and/or due to the UE being configured with UL skipping.

In one embodiment, when the UE is configured with UL skipping, the UE does not generate a MAC PDU for a dynamic UL grant if no data is available for MAC PDU transmission associated with the dynamic UL grant. For example, if the UE receives a dynamic UL grant and if the UE has no data available for MAC PDU transmission associated with the dynamic UL grant, the UE may not generate a MAC PDU for the dynamic UL grant based on and/or due to the UE being configured with UL skipping.

In one embodiment, the UE receives a dynamic UL grant (other than the two UL grants, for example). The UE does not generate a MAC PDU for the dynamic UL grant when (and/or if and/or based on a determination that) the UE has no available data for a MAC PDU transmission associated with the dynamic UL grant.

In one embodiment, the two UL grants are two dynamic UL grants for a HARQ entity.

In one embodiment, aperiodic CSI is not requested for the TTI. For example, there is no aperiodic CSI requested for the TTI. Alternatively and/or additionally, the UE may not be requested to provide aperiodic CSI (e.g., an aperiodic CSI report) to the base station via the TTI. Alternatively and/or additionally, the base station may not request the UE to provide aperiodic CSI (e.g., an aperiodic CSI report) to the base station via the TTI.

In one embodiment, the UE receives, from the base station (or a different base station), a second set of two UL grants for a second TTI. The UE does not generate any MAC PDU for the second TTI when (and/or if and/or based on a determination that) the UE does not have available data to be included in a MAC PDU for the second TTI (e.g., the UE does not have available data to be included in a second set of two MAC PDUs for the second TTI), and/or the UE merely has a second MAC CE, for a second padding BSR or for a second periodic BSR, with zero MAC SDUs, for inclusion in MAC PDUs for the second TTI (e.g., the UE merely has a second MAC CE, for a second padding BSR or for a second periodic BSR, with zero MAC SDUs, for inclusion in the second set of two MAC PDUs for the second TTI).

In one embodiment, the UE receives, from the base station (or a different base station), a second set of two UL grants for a second TTI. The UE does not generate any MAC PDU for the second TTI when (and/or if and/or based on a determination that) both MAC PDUs of a second set of two MAC PDUs for the second TTI do not comprise available data of the UE and/or when (and/or if and/or based on a determination that) the second set of two MAC PDUs for the second TTI merely comprise a second MAC CE, for a second padding BSR or for a second periodic BSR, with zero MAC SDUs.

In one embodiment, the UE receives, from the base station (or a different base station), a second set of two UL grants for a second TTI. The UE does not generate any MAC PDU for the second TTI when (and/or if and/or based on a determination that) generation of a second set of two MAC PDUs for the second TTI would result in the second set of two MAC PDUs not comprising available data of the UE and/or when (and/or if and/or based on a determination that) generation of the second set of two MAC PDUs for the second TTI would result in the second set of two MAC PDUs merely comprising a second MAC CE, for a second padding BSR or for a second periodic BSR, with zero MAC SDUs.

Referring back to FIGS. 3 and 4, in one exemplary embodiment of a UE configured with UL spatial multiplexing and UL skipping, the device 300 includes a program code 312 stored in the memory 310. The CPU 308 may execute program code 312 to enable the UE (i) to receive, from a base station, two UL grants for a TTI, (ii) to generate, for the TTI, two MAC PDUs, wherein a first MAC PDU (e.g., one MAC PDU) of the two MAC PDUs merely comprises a first MAC CE, for a first padding BSR or a first periodic BSR, with zero MAC SDUs and a second MAC PDU (e.g., one MAC PDU other than the first MAC PDU) of the two MAC PDUs comprises first available data of the UE and/or a MAC SDU, and (iii) to transmit the two MAC PDUs to the base station. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 6-9. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 6-9, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling the UE to perform UL transmissions appropriately and efficiently, even when the UE is configured with UL spatial multiplexing and UL skipping. In an example, applying one or more of the techniques presented herein enables the UE to generate and/or transmit two MAC PDUs for a TTI even when a first MAC PDU of the two MAC PDUs merely comprises padding (such as due to the second MAC PDU being able to accommodate available data of the UE), thus preventing a scenario in which the UE is unable to perform a transmission (such as due to a PHY of the UE being unable to generate a 4 layer transmission with a single transport block).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) configured with uplink (UL) spatial multiplexing and UL skipping, the method comprising:

receiving, from a base station, two UL grants for a Transmission Time Interval (TTI);

generating two Medium Access Control (MAC) Protocol Data Units (PDUs) for the TTI, wherein a first MAC PDU of the two MAC PDUs is able to accommodate all available data of the UE; and transmitting the two MAC PDUs to the base station.

2. The method of claim 1, wherein:
when the UE is configured with UL spatial multiplexing, the UE receives up to two UL grants for one TTI.

3. The method of claim 1, wherein:
when the UE is configured with UL skipping, the UE does not generate a MAC PDU for a dynamic UL grant if no data is available for MAC PDU transmission associated with the dynamic UL grant.

4. The method of claim 1, wherein:
the two UL grants are two dynamic UL grants for a Hybrid Automatic Repeat Request (HARM) entity.

5. The method of claim 1, wherein:
aperiodic Channel State Information (CSI) is not requested for the TTI.

6. The method of claim 1, wherein:
one of the two MAC PDUs merely comprises a MAC Control Element (CE), for a padding Buffer Status Report (BSR) or for a periodic BSR, with zero MAC Service Data Units (SDUs).

7. The method of claim 1, comprising:
receiving, from the base station, a second set of two UL grants for a second TTI; and not generating any MAC PDU for the second TTI based on a determination that at least one of:
the UE does not have available data to be included in a MAC PDU for the second TTI; or
the UE merely has a MAC Control Element (CE), for a padding Buffer Status Report (BSR) or for a periodic BSR, with zero MAC Service Data Units (SDUs), for inclusion in MAC PDUs for the second TTI.

8. A method of a User Equipment (UE) configured with uplink (UL) spatial multiplexing and UL skipping, the method comprising:
receiving, from a base station, two UL grants for a Transmission Time Interval (TTI);
generating two Medium Access Control (MAC) Protocol Data Units (PDUs) for the TTI, wherein:
a first MAC PDU of the two MAC PDUs merely comprises a first MAC Control Element (CE), for a first padding Buffer Status Report (BSR) or for a first periodic BSR, with zero MAC Service Data Units (SDUs); and
a second MAC PDU of the two MAC PDUs comprises at least one of available data of the UE or a MAC SDU; and
transmitting the two MAC PDUs to the base station.

9. The method of claim 8, wherein:
when the UE is configured with UL spatial multiplexing, the UE receives up to two UL grants for one TTI.

10. The method of claim 8, wherein:
when the UE is configured with UL skipping, the UE does not generate a MAC PDU for a dynamic UL grant if no data is available for MAC PDU transmission associated with the dynamic UL grant.

11. The method of claim 8, wherein:
the two UL grants are two dynamic UL grants for a Hybrid Automatic Repeat Request (HARM) entity.

12. The method of claim 8, wherein:
aperiodic Channel State Information (CSI) is not requested for the TTI.

13. The method of claim 8, comprising:
receiving, from the base station, a second set of two UL grants for a second TTI; and not generating any MAC PDU for the second TTI based on a determination that at least one of:
the UE does not have available data to be included in a MAC PDU for the second TTI; or
the UE merely has a second MAC CE, for a second padding BSR or for a second periodic BSR, with zero MAC Service Data Units (SDUs), for inclusion in MAC PDUs for the second TTI.

14. A User Equipment (UE) configured with uplink (UL) spatial multiplexing and UL skipping, the UE comprising:
a control circuit;
a processor installed in the control circuit; and
a memory installed in the control circuit and operatively coupled to the processor, wherein the processor is configured to execute a program code stored in the memory to perform operations, the operations comprising:
receiving, from a base station, two UL grants for a Transmission Time Interval (TTI);
generating two Medium Access Control (MAC) Protocol Data Units (PDUs) for the TTI, wherein a first MAC PDU of the two MAC PDUs is able to accommodate all available data of the UE; and
transmitting the two MAC PDUs to the base station.

15. The UE of claim 14, wherein:
when the UE is configured with UL spatial multiplexing, the UE receives up to two UL grants for one TTI.

16. The UE of claim 14, wherein:
when the UE is configured with UL skipping, the UE does not generate a MAC PDU for a dynamic UL grant if no data is available for the MAC PDU transmission associated with the dynamic UL grant.

17. The UE of claim 14, wherein:
the two UL grants are two dynamic UL grants for a Hybrid Automatic Repeat Request (HARM) entity.

18. The UE of claim 14, wherein:
aperiodic Channel State Information (CSI) is not requested for the TTI.

19. The UE of claim 14, wherein:
one of the two MAC PDUs merely comprises a MAC Control Element (CE), for a padding Buffer Status Report (BSR) or for a periodic BSR, with zero MAC Service Data Units (SDUs).

20. The UE of claim 14, the operations comprising:
receiving, from the base station, a second set of two UL grants for a second TTI; and not generating any MAC PDU for the second TTI based on a determination that at least one of:
the UE does not have available data to be included in a MAC PDU for the second TTI; or
the UE merely has a MAC Control Element (CE), for a padding Buffer Status Report (BSR) or for a periodic BSR, with zero MAC Service Data Units (SDUs), for inclusion in MAC PDUs for the second TTI.

* * * * *

UNITED STATES PATENT AND TRADEMARK OFFICE
CERTIFICATE OF CORRECTION

PATENT NO. : 11,184,918 B1
APPLICATION NO. : 17/314103
DATED : November 23, 2021
INVENTOR(S) : Yi-Hsuan Huang et al.

Page 1 of 1

It is certified that error appears in the above-identified patent and that said Letters Patent is hereby corrected as shown below:

In the Claims

In Column 51, Claim 4, Line 18, please replace "(HARM)", with --(HARQ)--;

In Column 52, Claim 11, Line 3, please replace "(HARM)", with --(HARQ)--;

In Column 52, Claim 17, Line 42, please replace "(HARM)", with --(HARQ)--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*